(12) United States Patent
Otsubo et al.

(10) Patent No.: US 11,441,453 B2
(45) Date of Patent: Sep. 13, 2022

(54) VALVE TIMING ADJUSTMENT DEVICE

(71) Applicant: DENSO CORPORATION, Kariya (JP)

(72) Inventors: Makoto Otsubo, Nisshin (JP); Kenichi Tomomatsu, Nisshin (JP); Shuhei Yamamoto, Nisshin (JP); Hiroki Takahashi, Kariya (JP); Soichi Kinouchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/447,482

(22) Filed: Sep. 13, 2021

(65) Prior Publication Data
US 2021/0404351 A1 Dec. 30, 2021

Related U.S. Application Data

(63) Continuation of application No. PCT/JP2020/010839, filed on Mar. 12, 2020.

(30) Foreign Application Priority Data

Mar. 15, 2019 (JP) .............................. JP2019-048968

(51) Int. Cl.
*F01L 1/352* (2006.01)
*F01L 1/047* (2006.01)
(Continued)

(52) U.S. Cl.
CPC .............. *F01L 1/352* (2013.01); *F01L 1/047* (2013.01); *F16D 3/04* (2013.01); *F16H 1/32* (2013.01); *F01L 2001/3521* (2013.01)

(58) Field of Classification Search
CPC ............. F01L 2820/032; F01L 2250/02; F01L 2250/04; F01L 1/344; F01L 2810/04;
(Continued)

(56) References Cited

U.S. PATENT DOCUMENTS

2018/0038246 A1 2/2018 Toda et al.
2018/0073656 A1 3/2018 Miyachi et al.
2019/0292952 A1 9/2019 Miyachi et al.

FOREIGN PATENT DOCUMENTS

WO WO-2017110172 A1 * 6/2017 .............. F01L 1/352

OTHER PUBLICATIONS

WO-2017110172-A1, English Language Machine Translation (Year: 2017).*
(Continued)

*Primary Examiner* — Devon C Kramer
*Assistant Examiner* — Wesley G Harris
(74) *Attorney, Agent, or Firm* — Nixon & Vanderhye P.C.

(57) ABSTRACT

An Oldham coupling includes: a driven Oldham flange that is formed at a drive-side rotor; a drive Oldham flange that is formed at a planetary rotor; and an Oldham intermediate that is configured to synchronize rotation of the driven Oldham flange and rotation of the drive Oldham flange. A thrust section is formed at a rotor plate portion which is a portion other than the Oldham coupling. The thrust section is configured to limit tilting of the planetary rotor relative to the driven Oldham flange when the thrust section contacts the planetary rotor in an axial direction. There is satisfied a relationship of $\theta2>\theta1$ where: $\theta1$ is a maximum tilt amount of the planetary rotor relative to the driven Oldham flange; and $\theta2$ is a maximum tilt amount of the planetary rotor in a clearance formed at the Oldham coupling.

2 Claims, 15 Drawing Sheets

(51) Int. Cl.
*F16D 3/04* (2006.01)
*F16H 1/32* (2006.01)

(58) Field of Classification Search
CPC ... F01L 1/352; F01L 1/047; F01L 2001/3521; F01L 1/024; F01L 2820/02; F01L 1/022; F01L 1/356; F16D 3/04; F16H 1/32; F01C 17/066
USPC .......................................... 464/102, 104, 105
See application file for complete search history.

(56) References Cited

OTHER PUBLICATIONS

U.S. Appl. No. 17/473,503, to Otsubo, et al., entitled "Valve Timing Adjustment Device", filed Sep. 13, 2021 (56 pages).

\* cited by examiner

SECOND DIRECTION

SECOND DIRECTION

VALVE TIMING ADJUSTMENT DEVICE

CROSS REFERENCE TO RELATED APPLICATIONS

This application is a continuation application of International Patent Application No. PCT/JP2020/010839 filed on Mar. 12, 2020, which designated the U.S. and claims the benefit of priority from Japanese Patent Application No. 2019-048968 filed on Mar. 15, 2019. The entire disclosures of all of the above applications are incorporated herein by reference.

TECHNICAL FIELD

The present disclosure relates to a valve timing adjustment device.

BACKGROUND

Previously, there is a valve timing adjustment device that uses an Oldham coupling as a member for generating relative rotation between a drive-side rotor, which is rotated synchronously with a crankshaft, and a driven-side rotor, which is rotated integrally with a camshaft, at an internal combustion engine.

For example, one previously proposed valve timing adjustment device includes: an internal gear section, which is formed at the driven-side rotor; a planetary rotor, which is meshed with the internal gear section; and the Oldham coupling. The Oldham coupling includes: driven Oldham flanges, which are formed at the drive-side rotor; drive Oldham flanges, which are formed at the planetary rotor; and an Oldham intermediate, which is configured to synchronize rotation of the driven Oldham flange and rotation of drive Oldham flange while permitting eccentricity between the driven Oldham flanges and the drive Oldham flanges.

SUMMARY

This section provides a general summary of the disclosure, and is not a comprehensive disclosure of its full scope or all of its features.

According to the present disclosure, there is provided a valve timing adjustment device for adjusting a valve timing of a valve that is opened and closed by a camshaft with a torque transmitted from a crankshaft at an internal combustion engine. The valve timing adjustment device includes a drive-side rotor, a driven-side rotor, an internal gear section, a planetary rotor, an Oldham coupling and a thrust section. The internal gear section is formed at one of the driven-side rotor and the drive-side rotor. The Oldham coupling includes: a driven Oldham flange that is formed at another one of the driven-side rotor and the drive-side rotor; a drive Oldham flange that is formed at the planetary rotor; and an Oldham intermediate that is configured to synchronize rotation of the driven Oldham flange and rotation of the drive Oldham flange while permitting eccentricity between the driven Oldham flange and the drive Oldham flange. The thrust section is formed at a portion which is other than the Oldham coupling. The thrust section is configured to limit tilting of the planetary rotor relative to the driven Oldham flange when the thrust section contacts the planetary rotor in an axial direction. The valve timing adjustment device is configured to satisfy a relationship of $\theta 2 > \theta 1$ where: $\theta 1$ is a maximum tilt amount of the planetary rotor relative to the driven Oldham flange; and $\theta 2$ is a maximum tilt amount of the planetary rotor in a clearance formed at the Oldham coupling.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
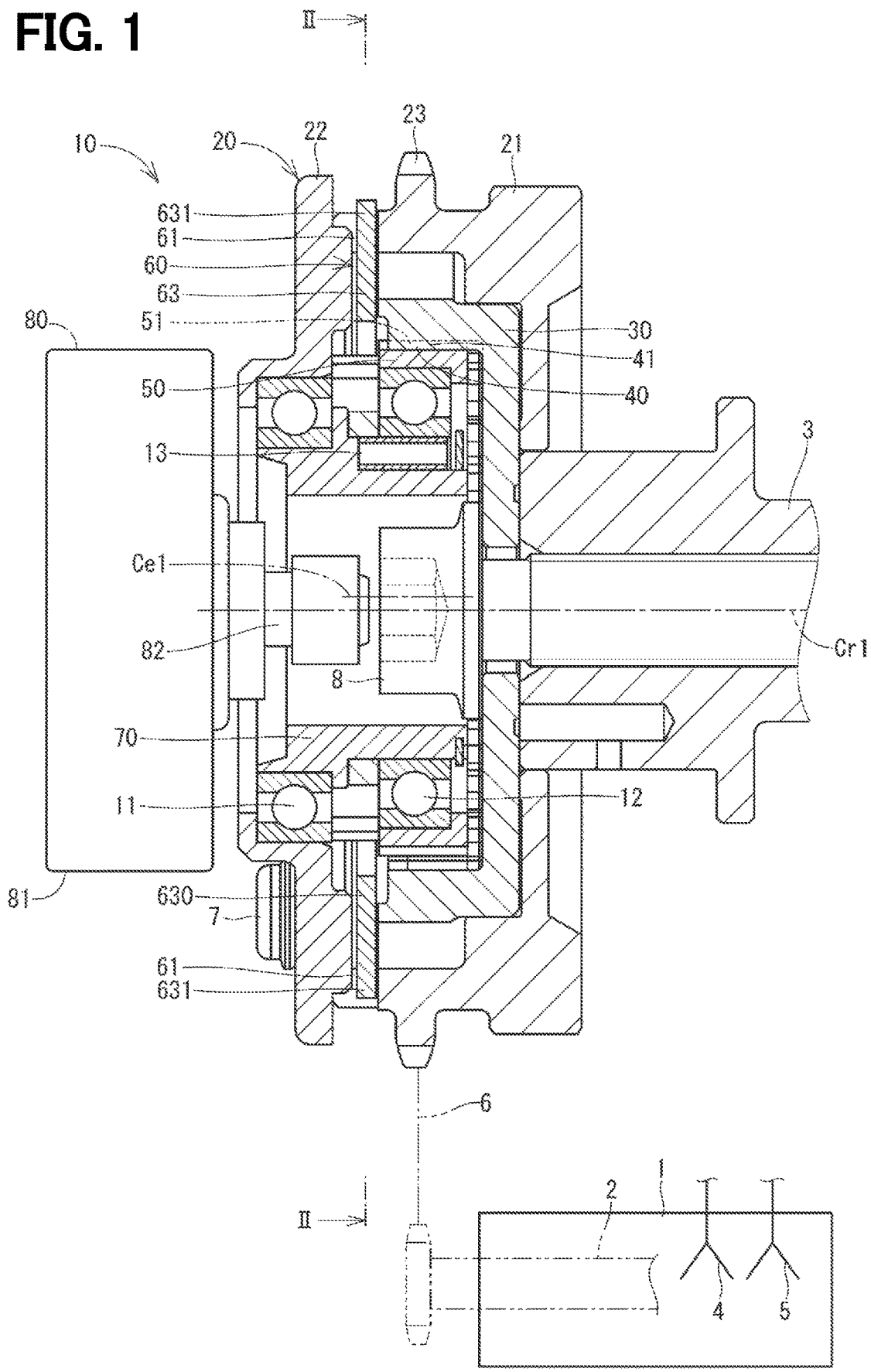
FIG. 1 is a cross-sectional view of a valve timing adjustment device of a first embodiment.

Previously, there is a valve timing adjustment device that uses an Oldham coupling as a member for generating relative rotation between a drive-side rotor, which is rotated synchronously with a crankshaft, and a driven-side rotor, which is rotated integrally with a camshaft, at an internal combustion engine.

For example, one previously proposed valve timing adjustment device includes: an internal gear section, which is formed at the driven-side rotor; a planetary rotor, which is meshed with the internal gear section; and the Oldham coupling. The Oldham coupling includes: driven Oldham flanges, which are formed at the drive-side rotor; drive Oldham flanges, which are formed at the planetary rotor; and an Oldham intermediate, which is configured to synchronize rotation of the driven Oldham flange and rotation of drive Oldham flange while permitting eccentricity between the driven Oldham flanges and the drive Oldham flanges.

The valve timing adjustment device further includes an urging member which urges the planetary rotor in the axial direction against another member. The orientation of the planetary rotor is stabilized by the urging member so that friction of the Oldham coupling is reduced, and transmission efficiency of the Oldham coupling is improved.

However, in the valve timing adjustment device, it is difficult to fully stabilize the orientation of the planetary rotor by the urging member alone, and thereby it is difficult to reduce the friction of the Oldham coupling to its maximum extent. Therefore, the improvement of the transmission efficiency of the Oldham coupling may possibly be limited. Furthermore, since the urging member is required, the structure may possibly be complicated, and the costs may possibly be increased.

According to the present disclosure, there is provided a valve timing adjustment device for adjusting a valve timing of a valve that is opened and closed by a camshaft with a torque transmitted from a crankshaft at an internal combustion engine. The valve timing adjustment device includes a drive-side rotor, a driven-side rotor, an internal gear section, a planetary rotor, an Oldham coupling and a thrust section.

The drive-side rotor is configured to be rotated synchronously with the crankshaft about a rotation center axis that is coaxial with the camshaft. The driven-side rotor is configured to be rotated integrally with the camshaft about the rotation center axis. The internal gear section is formed at one of the driven-side rotor and the drive-side rotor. The planetary rotor has a planetary gear section which is eccentric to the rotation center axis and is meshed with the internal gear section. The Oldham coupling includes: a driven Oldham flange that is formed at another one of the driven-side rotor and the drive-side rotor; a drive Oldham flange that is formed at the planetary rotor; and an Oldham intermediate that is configured to synchronize rotation of the driven Oldham flange and rotation of the drive Oldham flange while permitting eccentricity between the driven Oldham flange and the drive Oldham flange.

The thrust section is formed at a portion which is other than the Oldham coupling. The thrust section is configured to limit tilting of the planetary rotor relative to the driven Oldham flange when the thrust section contacts the planetary rotor in an axial direction of the rotation center axis. Therefore, the orientation of the planetary rotor can be stabilized by the thrust section that is formed at the portion which is other than the Oldham coupling.

The valve timing adjustment device is configured to satisfy a relationship of θ2>θ1 where: θ1 is a maximum tilt amount of the planetary rotor relative to the driven Oldham flange; and θ2 is a maximum tilt amount of the planetary rotor in a clearance formed at the Oldham coupling. Therefore, the tilting of the planetary rotor is not limited by the members of the Oldham coupling, and even in the state where the planetary rotor is tilted by the maximum tilt amount θ1 relative to the driven Oldham flange, it is possible to ensure presence of the clearance. Thus, the friction of the Oldham coupling can be reduced. As a result, the transmission efficiency of the Oldham coupling can be improved with the simple structure.

Hereinafter, a valve timing adjustment device of various embodiments will be described with reference to the drawings. The same reference sign is used for substantially identical constituent elements among the embodiments, and description of the same will be omitted for the sake of simplicity. In addition, substantially identical component parts in the embodiments have the same or similar effects and advantages.

First Embodiment

FIG. 1 shows a valve timing adjustment device of a first embodiment. The valve timing adjustment device 10 is installed to a torque transmission path that extends from a crankshaft 2 to a camshaft 3 at an engine 1 (serving as an internal combustion engine) of a vehicle. The camshaft 3 opens and closes intake valves 4 or exhaust valves 5 which serve as valves of the engine 1. The valve timing adjustment device 10 adjusts a valve timing of the intake valves 4.

The valve timing adjustment device 10 is driven by an actuator 80. The actuator 80 is an electric motor, such as a brushless motor, and includes a housing 81 and a control shaft 82. The housing 81 rotatably supports the control shaft 82. An operation of the actuator 80 is controlled by an electronic control unit (not shown). The electronic control unit includes, for example, a drive driver, a microcomputer, and the like, and rotationally drives the control shaft 82 by controlling energization of the actuator 80.

Figure 2:
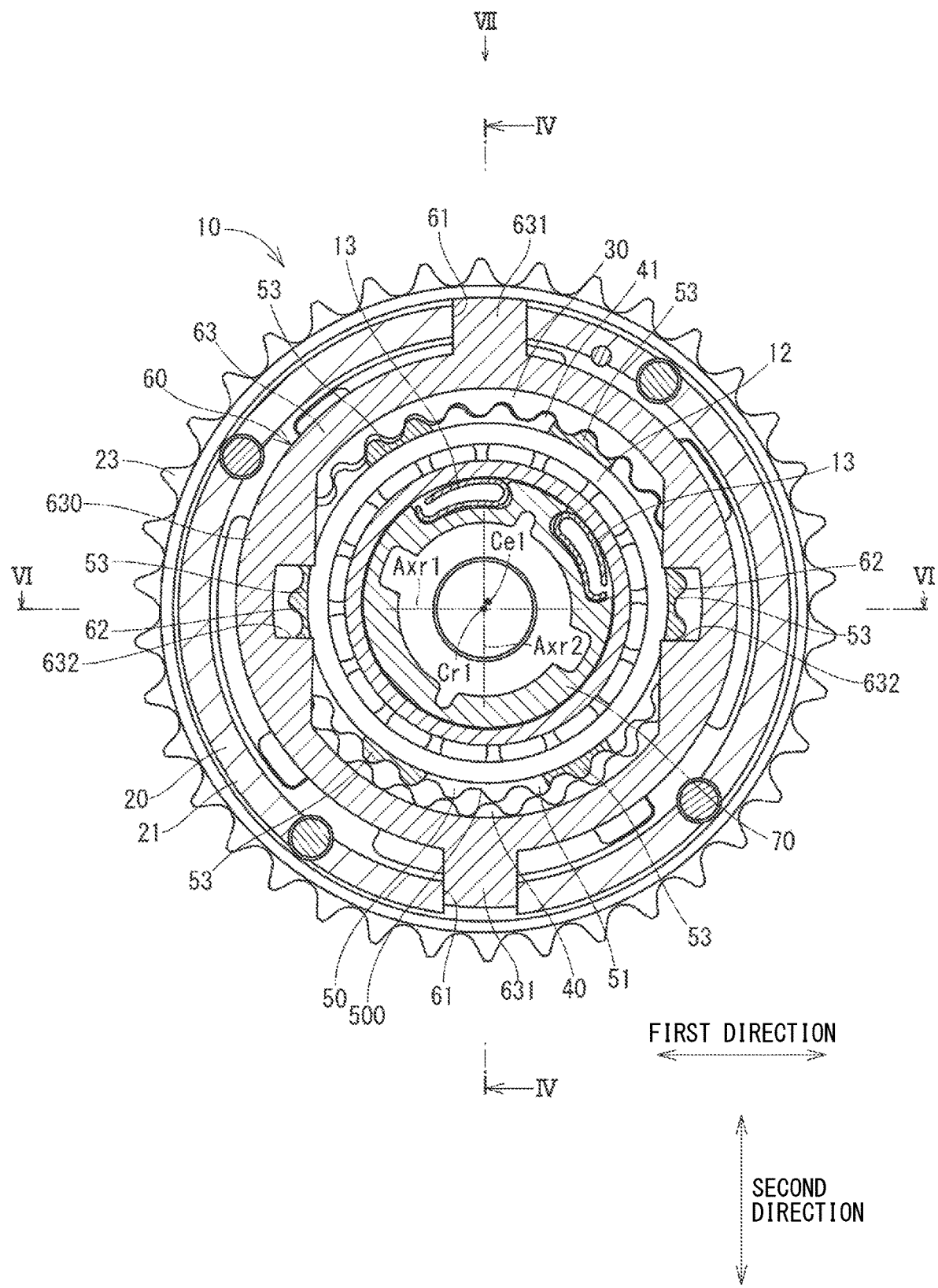
FIG. 2 is a cross-sectional view taken along line II-II in FIG. 1.

As shown in FIGS. 1 and 2, the valve timing adjustment device 10 includes a drive-side rotor 20, a driven-side rotor 30, an internal gear section 40, a planetary rotor 50, an Oldham coupling 60, an eccentric shaft 70, a bearing 11, a bearing 12, a plurality of urging members 13 and a thrust section 90.

The drive-side rotor 20 includes a rotor tubular portion 21, a rotor plate portion 22 and an engaging portion 23. The rotor tubular portion 21 is shaped in a bottomed tubular form. The rotor plate portion 22 is shaped in a ring plate form and has a surface that contacts an end part of the rotor tubular portion 21 which is opposite to a bottom part of the rotor tubular portion 21. The rotor tubular portion 21 and the rotor plate portion 22 are integrally assembled together by a plurality of bolts 7. The engaging portion 23 is, for example, a gear and is formed in a ring form at an outer peripheral wall of the rotor tubular portion 21.

A looped transmission member 6 is wound around the crankshaft 2 and the engaging portion 23. The looped transmission member 6 is, for example, a chain shaped in a loop form. The looped transmission member 6 transmits a torque of the crankshaft 2 to the engaging portion 23. Therefore, the drive-side rotor 20 is rotated about a rotation center axis Cr1, which is coaxial with the camshaft 3, synchronously with the crankshaft 2.

The driven-side rotor 30 is shaped in a bottomed tubular form. The driven-side rotor 30 is fixed to the camshaft 3 by a bolt 8 such that the driven-side rotor 30 is coaxial with the camshaft 3. Therefore, the driven-side rotor 30 is rotated synchronously with the camshaft 3 about the rotation center axis Cr1.

The internal gear section 40 is formed at the driven-side rotor 30 (serving as one of the driven-side rotor 30 and the drive-side rotor 20). The internal gear section 40 is formed at an inner peripheral wall of the driven-side rotor 30.

The planetary rotor 50 includes a rotator main body 500, a planetary gear section 51, a plurality of cutouts 52 and a plurality of projections 53.

Figure 3:
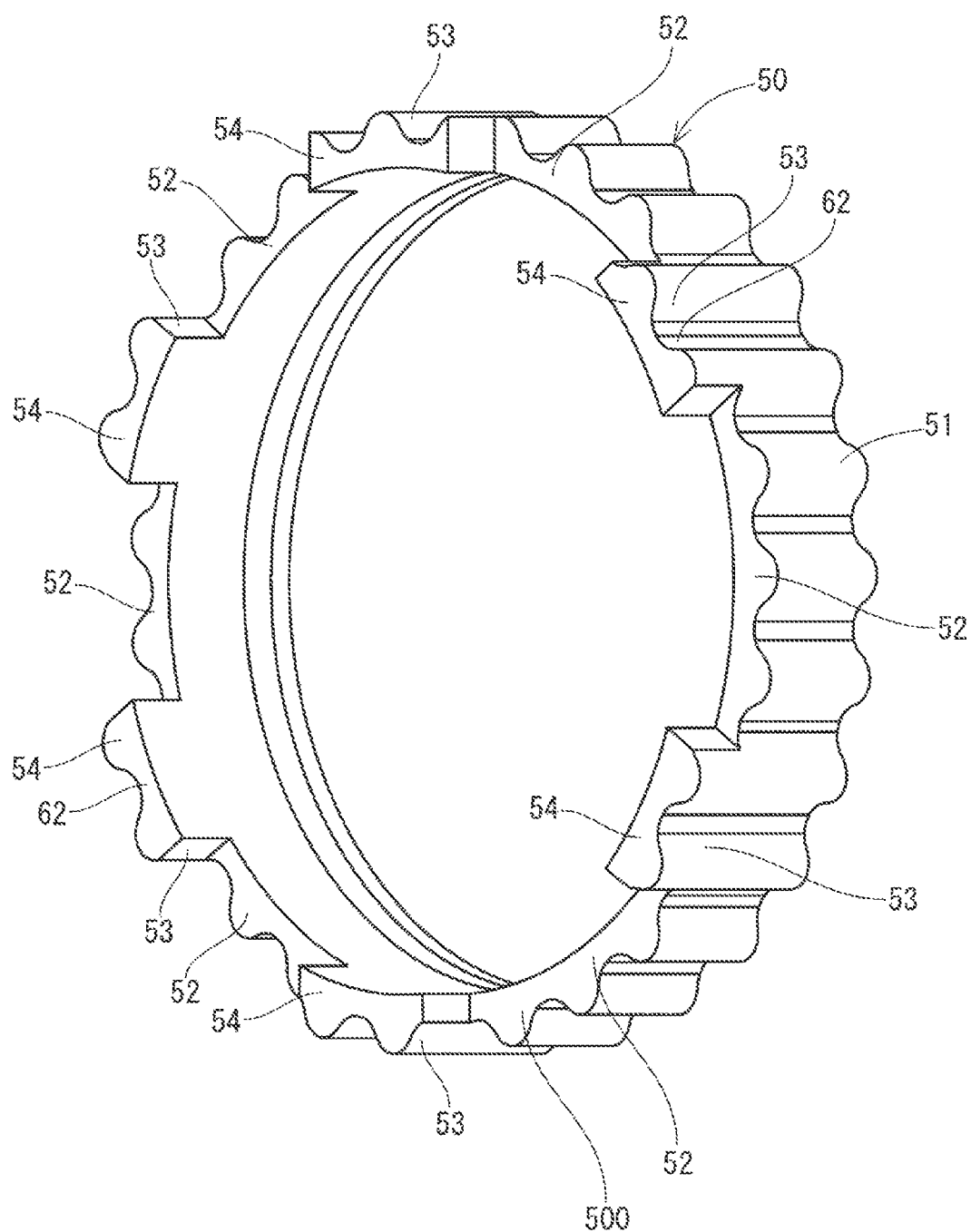
FIG. 3 is a perspective view of a planetary rotor of the valve timing adjustment device of the first embodiment.

As shown in FIG. 3, the rotator main body 500 is shaped generally in a cylindrical tubular form. The planetary gear section 51 is formed in a ring form at an outer peripheral wall of the rotator main body 500. Each of the cutouts 52 is formed in such a way that it is cut out from one end part toward the other end part of the rotator main body 500. The number of the cutouts 52 is six, and the cutouts 52 are arranged at equal intervals in a circumferential direction along the rotator main body 500. Thereby, the projections 53, the number of which is six, are formed such that each of the projections 53 is interposed between corresponding adjacent two of the cutouts 52.

As shown in FIGS. 1 and 2, the planetary gear section 51 is eccentric to the rotation center axis Cr1 and is meshed with the internal gear section 40. Here, a meshing part 41 is formed between the planetary gear section 51 and the internal gear section 40.

The Oldham coupling 60 includes a plurality of driven Oldham flanges 61, a plurality of drive Oldham flanges 62 and an Oldham intermediate 63.

As shown in FIGS. 1 and 2, the driven Oldham flanges 61 are formed at the drive-side rotor 20 (serving as another one of the driven-side rotor 30 and the drive-side rotor 20). Each of the driven Oldham flanges 61 is recessed from an end part of the rotor tubular portion 21, which is opposite to the bottom part of the rotor tubular portion 21, toward the bottom part. The number of the driven Oldham flanges 61 is two, and the driven Oldham flanges 61 are arranged at equal intervals in the circumferential direction along the rotor tubular portion 21. Specifically, the driven Oldham flanges 61 are opposed to each other about the rotation center axis Cr1.

As shown in FIGS. 2 and 3, the drive Oldham flanges 62 are formed at the planetary rotor 50. The drive Oldham flanges 62 are respectively formed at two of the projections 53 of the planetary rotor 50 while these two projections 53 are opposed to each other about an axis of the rotator main body 500.

The Oldham intermediate 63 includes an Oldham main body 630, a plurality of Oldham projections 631 and a plurality of Oldham recesses 632. The Oldham main body 630 is shaped in a ring plate form.

Each of the Oldham projections 631 radially outwardly projects from an outer periphery of the Oldham main body 630. The number of the Oldham projections 631 is two, and the Oldham projections 631 are arranged at equal intervals in the circumferential direction along the Oldham main body 630. Specifically, the Oldham projections 631 are opposed to each other about an axis of the Oldham main body 630.

Each of the Oldham recesses 632 is radially outwardly recessed from an inner periphery of the Oldham main body 630. The number of the Oldham recesses 632 is two, and the Oldham recesses 632 are arranged at equal intervals in the circumferential direction along the Oldham main body 630. Specifically, the Oldham recesses 632 are opposed to each other about the axis of the Oldham main body 630. Here, the two Oldham projections 631 and the two Oldham recesses 632 are arranged such that a straight line, which connects between centers of the two Oldham projections 631, is perpendicular to a straight line, which connects between centers of the two Oldham recesses 632.

As shown in FIG. 2, the Oldham intermediate 63 is arranged such that the Oldham recesses 632 are respectively engaged with the drive Oldham flanges 62, and the Oldham projections 631 are respectively engaged with the driven Oldham flanges 61.

The Oldham intermediate 63 is movable relative to the drive Oldham flanges 62 in a first direction. When the Oldham intermediate 63 is moved relative to the drive Oldham flanges 62 in the first direction, the Oldham recesses 632 and the drive Oldham flanges 62 are slid relative to each other.

Furthermore, the Oldham intermediate 63 is movable relative to the driven Oldham flanges 61 in a second direction. Here, the second direction is a direction that is perpendicular to the first direction. When the Oldham intermediate 63 is moved relative to the driven Oldham flanges 61 in the second direction, the Oldham projections 631 and the driven Oldham flanges 61 are slid relative to each other.

With the above structure, the Oldham intermediate 63 can synchronize the rotation of the driven Oldham flanges 61 and the rotation of the drive Oldham flanges 62 while permitting the eccentricity between the driven Oldham flanges 61 and the drive Oldham flanges 62.

The eccentric shaft 70 is shaped in a tubular form. The eccentric shaft 70 is placed at an inside of the rotor plate portion 22, an inside of the Oldham intermediate 63 and an inside of the driven-side rotor 30.

The bearing 11 is, for example, a ball bearing shaped in a ring form and is installed between an outer peripheral wall of an end part of the eccentric shaft 70, which is opposite to the camshaft 3, and an inner peripheral wall of the rotor plate portion 22. The bearing 12 is, for example, a ball bearing shaped in a ring form and is installed between an outer peripheral wall of a camshaft 3 side end part of the eccentric shaft 70 and the inner peripheral wall of the planetary rotor 50.

The bearing 11 rotatably supports the eccentric shaft 70. The bearing 12 rotatably supports the planetary rotor 50.

The outer peripheral wall of the camshaft 3 side end part of the eccentric shaft 70 is eccentric to the rotation center axis Cr1. Specifically, the outer peripheral wall of the camshaft 3 side end part of the eccentric shaft 70 is formed to extend along a cylindrical surface that is centered on an eccentric center axis Ce1 while the eccentric center axis Ce1 is spaced from the rotation center axis Cr1 in an eccentric direction and is parallel to the rotation center axis Cr1. The outer peripheral wall of the opposite end part of the eccentric shaft 70, which is opposite to the camshaft 3, is formed to extend along a cylindrical surface that is centered on the rotation center axis Cr1.

When the eccentric shaft 70 is rotated about the rotation center axis Cr1, the planetary rotor 50 orbits while spinning in a state where the planetary gear section 51 is meshed with the internal gear section 40. At this time, the Oldham intermediate 63 is moved relative to the drive Oldham flanges 62 in the first direction and is moved relative to the driven Oldham flanges 61 in the second direction. Therefore, the Oldham intermediate 63 can synchronize the rotation of the driven Oldham flanges 61 and the rotation of the drive Oldham flanges 62 while permitting the eccentricity between the driven Oldham flanges 61 and the drive Oldham flanges 62. Thus, a rotational phase between the drive-side rotor 20 and the driven-side rotor 30 changes.

The urging members 13 are installed to the outer peripheral wall of the camshaft 3 side end part of the eccentric shaft 70 such that the urging members 13 are placed at an eccentric side of the outer peripheral wall of the camshaft 3 side end part of the eccentric shaft 70. The urging members 13 urge the planetary rotor 50 through the bearing 12 toward the radially outer side of the planetary rotor 50, i.e., in the eccentric direction of the planetary rotor 50. The urging members 13 urge the planetary gear section 51 against the internal gear section 40 in the eccentric direction of the planetary rotor 50. Therefore, the clearance at the meshing part 41, at which the internal gear section 40 and the planetary rotor 50 are meshed with each other, is reduced, and thereby it is possible to reduce the impact force and noise, such as backlash noise, generated when the internal gear section 40 and the planetary rotor 50 are rotated while meshing with each other.

The actuator 80 is installed such that an end part of the control shaft 82 is engaged with a groove formed at an inner peripheral wall of the eccentric shaft 70. When the control shaft 82 of the actuator 80 is rotated in response to the control operation of the electronic control unit, the eccentric shaft 70 is rotated about the rotation center axis Cr1. When the eccentric shaft 70 is rotated toward one side in the rotation direction, the drive-side rotor 20 is rotated relative to the driven-side rotor 30 toward the one side in the rotation direction. In this way, the valve timing of the intake valves 4 is changed toward the advance side. When the eccentric shaft 70 is rotated toward the other side in the rotation direction, the drive-side rotor 20 is rotated relative to the driven-side rotor 30 in the rotation direction. In this way, the valve timing of the intake valves 4 is changed toward the retard side.

Figure 4:
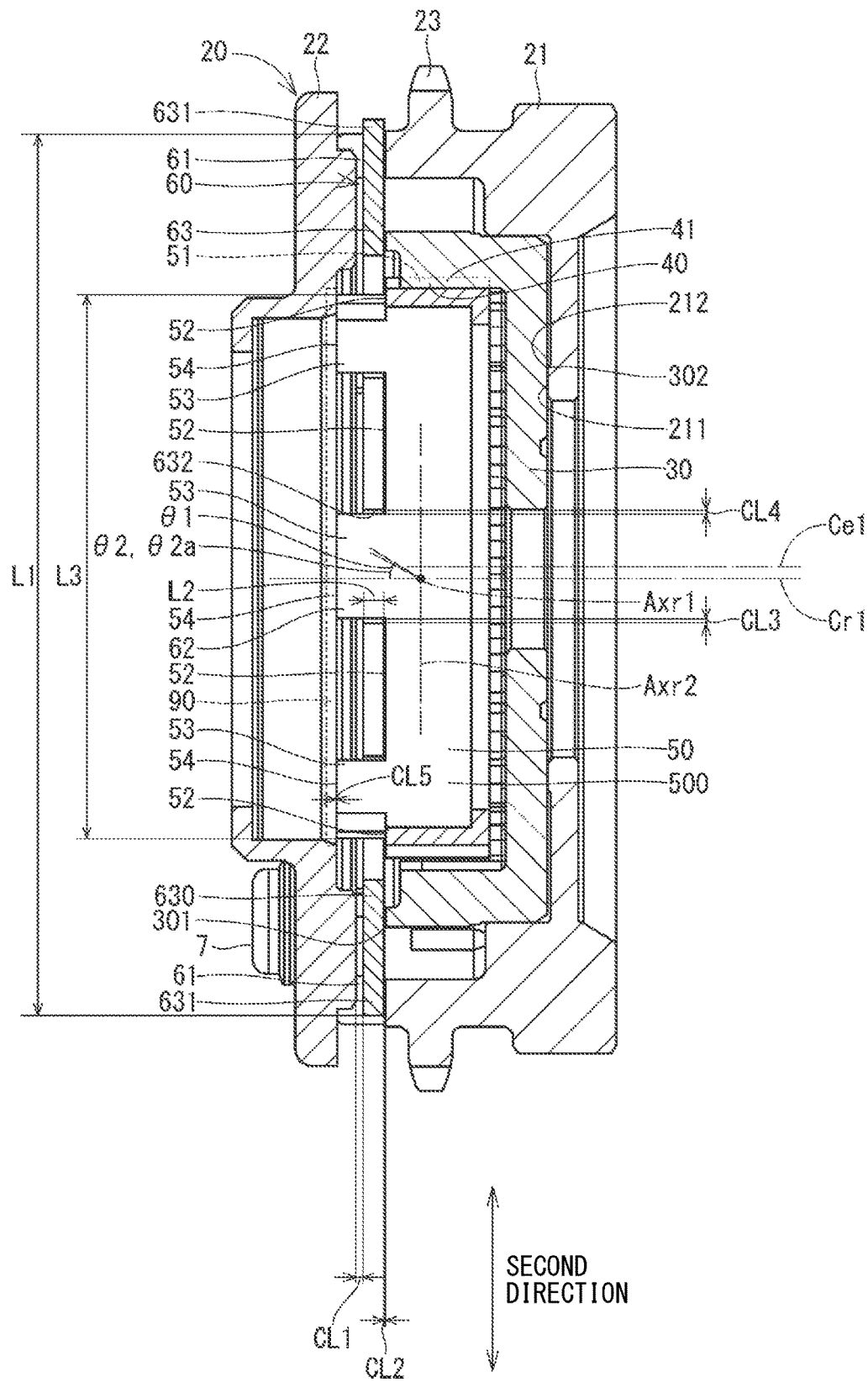
FIG. 4 is a cross-sectional view showing a portion of the valve timing adjustment device taken along line IV-IV in FIG. 2.
Figure 5:
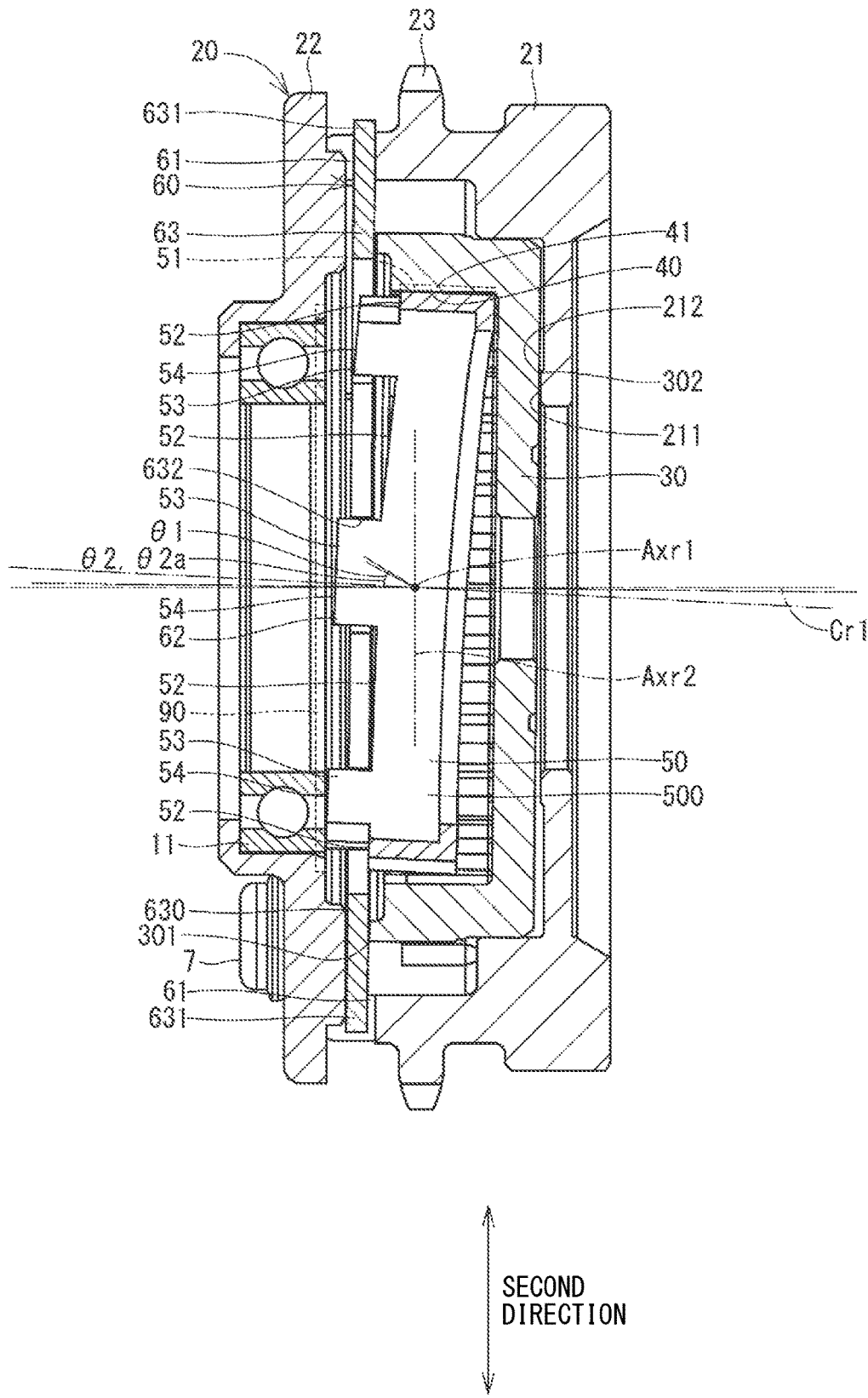
FIG. 5 is a cross-sectional view showing the portion of the valve timing adjustment device of the first embodiment.
Figure 6:
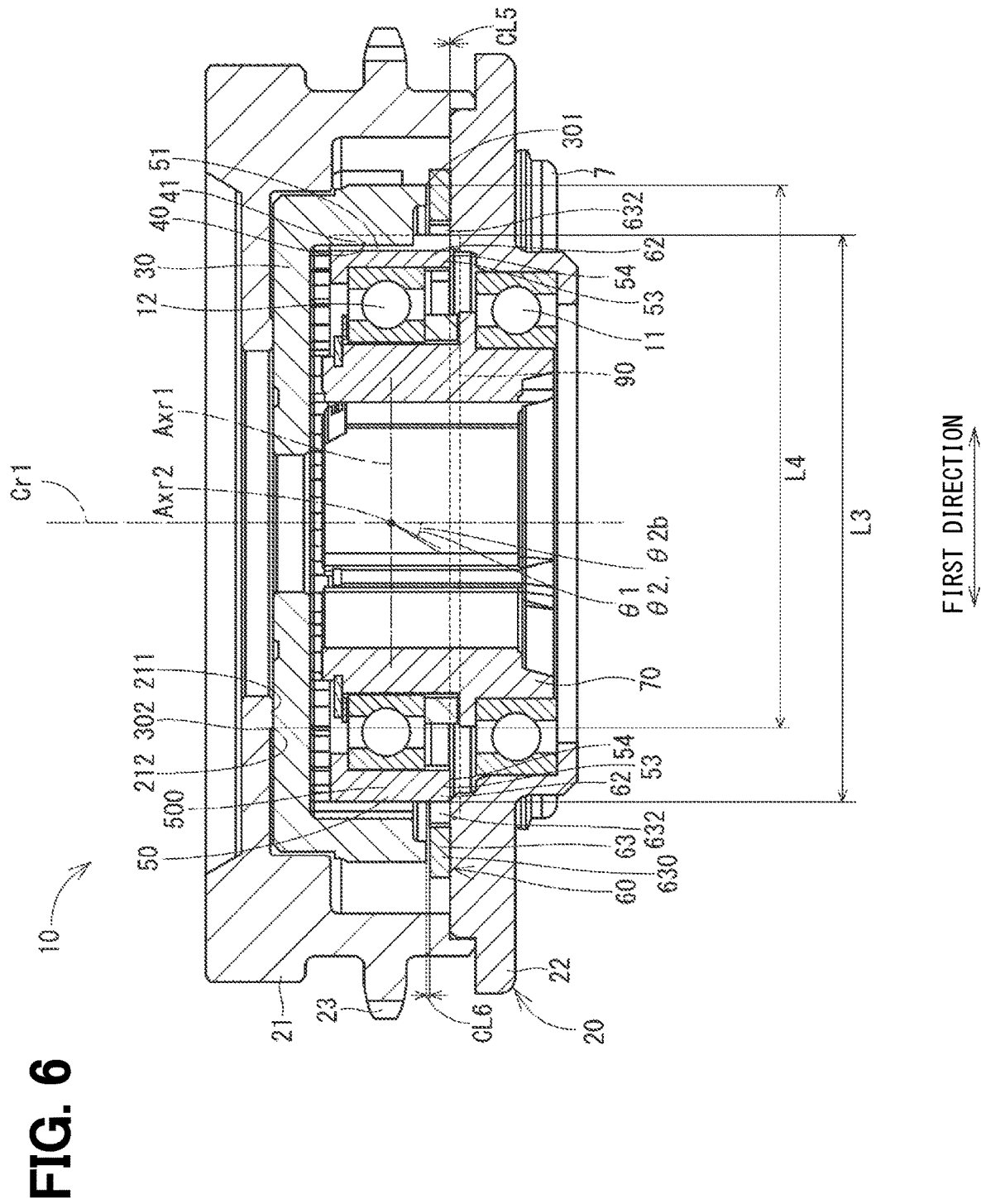
FIG. 6 is a cross-sectional view taken along line VI-VI in FIG. 2.

In the present embodiment, the thrust section 90 is formed at the rotor plate portion 22 of the drive-side rotor 20 (serving as a portion which is other than the Oldham coupling 60) at a location where the thrust section 90 is opposed to the planetary rotor 50 (see FIGS. 4 to 6). The thrust section 90 is configured to contact a surface of the planetary rotor 50, i.e., an end surface 54 of one or more of the projections 53 located on the side opposite to the camshaft 3 in the axial direction of the rotation center axis Cr1. The thrust section 90 is configured to limit tilting of the planetary rotor 50 relative to the driven Oldham flanges 61 when the thrust section 90 contacts the planetary rotor 50 in the axial direction of the rotation center axis Cr1 (see FIG. 5).

In the present embodiment, the valve timing adjustment device 10 is configured to satisfy a relationship of $\theta2>\theta1$ where: $\theta1$ is a maximum tilt amount of the planetary rotor 50 relative to the driven Oldham flanges 61; and $\theta2$ is a maximum tilt amount of the planetary rotor 50 in a clearance formed at the Oldham coupling 60.

Here, $\theta1$ corresponds to the rotation angle of the planetary rotor 50 relative to the driven Oldham flanges 61 when the tilting of the planetary rotor 50 is limited by the thrust section 90.

Furthermore, in the present embodiment, the valve timing adjustment device 10 is configured to satisfy at least one of a relationship of $\theta2b>\theta1$ or a relationship of $\theta2a>\theta1$ where: the relative moving direction of the Oldham intermediate 63 relative to the drive Oldham flanges 62 is defined as the first direction; the relative moving direction of the Oldham intermediate 63 relative to the driven Oldham flanges 61 is defined as the second direction; $\theta2a$ is a maximum tilt amount of the planetary rotor 50 in the clearance formed at the Oldham coupling 60 and is a rotation angle of the planetary rotor 50 about a first rotation axis Axr1 that is parallel to the first direction; and $\theta2b$ is a maximum tilt amount of the planetary rotor 50 in the clearance formed at the Oldham coupling 60 and is a rotation angle of the planetary rotor 50 about a second rotation axis Axr2 that is parallel to the second direction (see FIGS. 4 and 6).

With reference to FIG. 4, in the present embodiment, the valve timing adjustment device 10 is configured to satisfy a relationship of $\theta1=\arctan(CL5/L3)$ and a relationship of $\theta2a=\arctan((CL1+CL2)/L1)+\arctan((CL3+CL4)/L2)$ where: CL1 is one of two opposite axial clearances respectively formed between the Oldham intermediate 63 and the drive-side rotor 20 in the axial direction, and CL2 is another one of the two opposite axial clearances respectively formed between the Oldham intermediate 63 and the drive-side rotor 20 in the axial direction; L1 is a diameter of an axially contacting part of the Oldham intermediate 63 that is configured to axially contact the drive-side rotor 20; CL3 is one of two opposite circumferential clearances respectively formed between the planetary rotor 50 and the Oldham intermediate 63 in the circumferential direction, and CL4 is another one of the two opposite circumferential clearances respectively formed between the planetary rotor 50 and the Oldham intermediate 63 in the circumferential direction; L2 is an axial length of a circumferentially contacting part of the Oldham intermediate 63 that is configured to circumferentially contact the planetary rotor 50; CL5 is an axial clearance between the planetary rotor 50 and the drive-side rotor 20; and L3 is a diameter of an axially contacting part of the planetary rotor 50 that is configured to axially contact the drive-side rotor 20.

Figure 7:
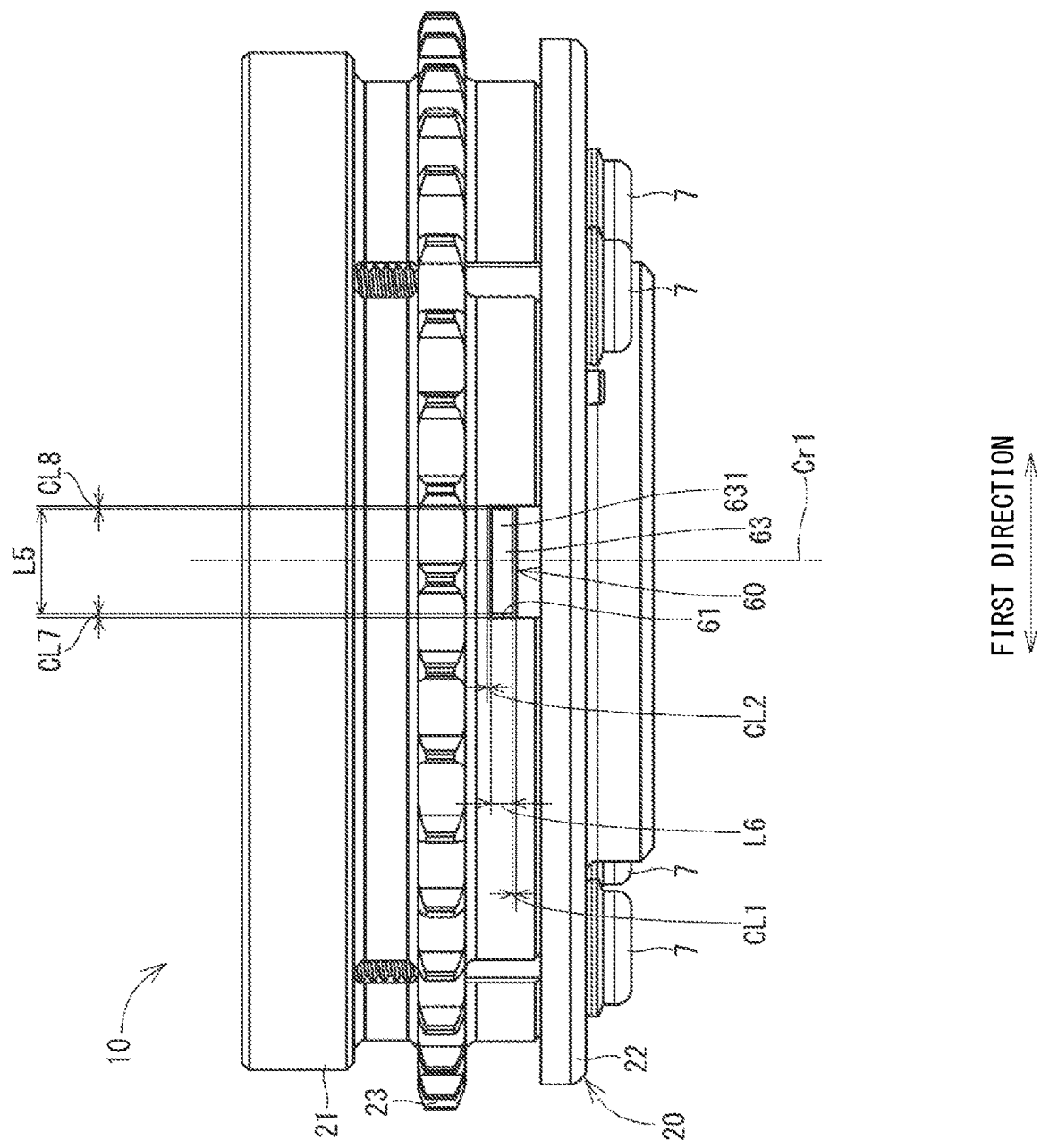
FIG. 7 is a view seen in a direction of an arrow VII in FIG. 2.
Figure 8:
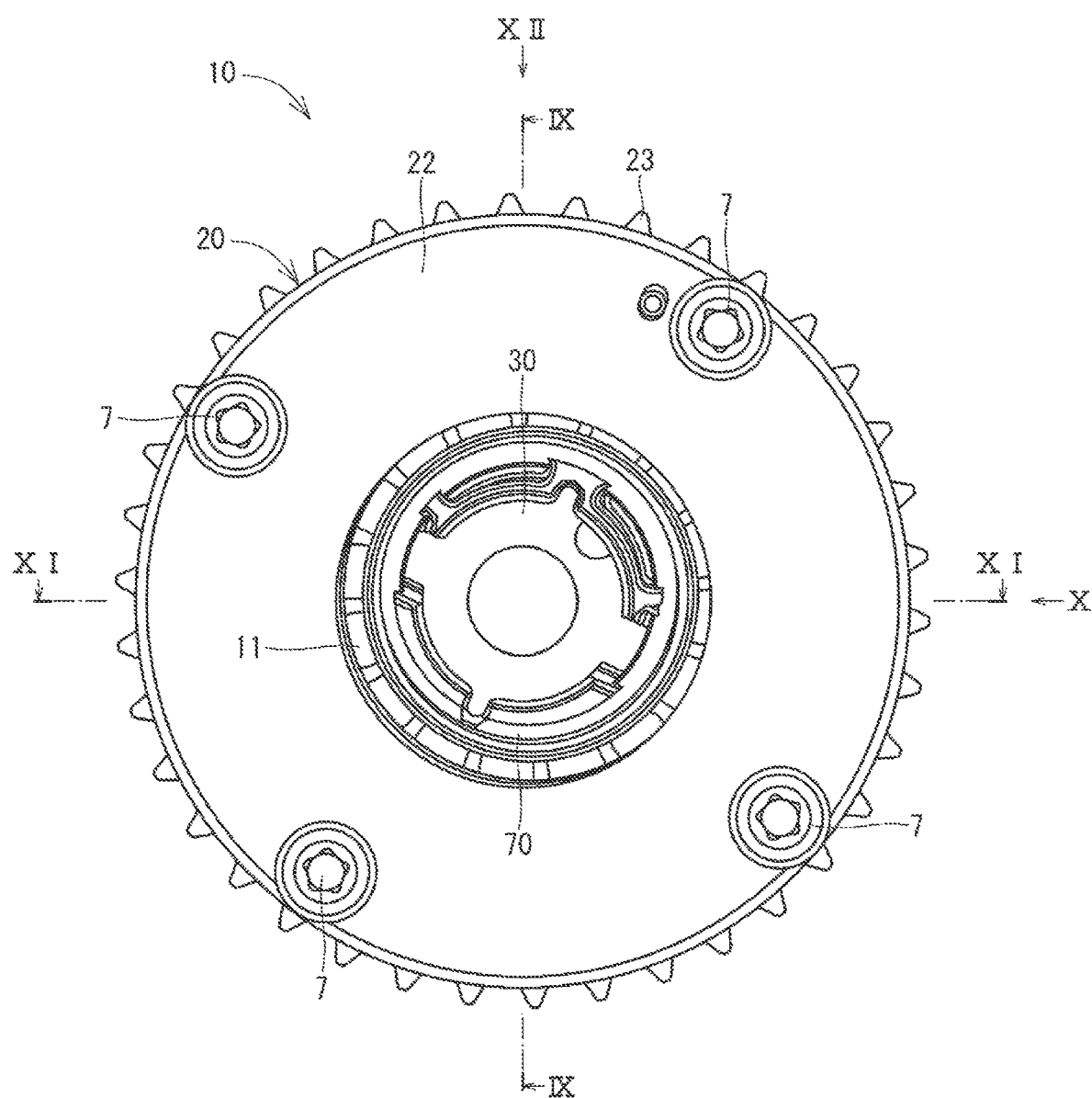
FIG. 8 is a diagram indicating a valve timing adjustment device of a second embodiment.

Furthermore, with reference to FIGS. 6 and 7, in the present embodiment, the valve timing adjustment device 10 is configured to satisfy a relationship of $\theta2b=\arctan(CL6/L4)+\min\{\arctan((CL7+CL8)/L6), \arctan((CL1+CL2)/L5)\}$ where: CL6 is an axial clearance between the Oldham intermediate 63 and the driven-side rotor 30; L4 is a maximum distance in a direction perpendicular to the rotation center axis Cr1 between: one axially contacting part of the driven-side rotor 30 that is configured to axially contact another member at one axial side of the driven-side rotor 30; and another axially contacting part of the driven-side rotor 30 that is configured to axially contact further another member at another axial side of the driven-side rotor 30; L5 is a circumferential length of the axially contacting part of the Oldham intermediate 63 that is configured to axially contact the drive-side rotor 20; CL7 is one of two opposite circumferential clearances respectively formed between the Oldham intermediate 63 and the drive-side rotor 20 in the circumferential direction, and CL8 is another one of the two opposite circumferential clearances respectively formed between the Oldham intermediate 63 and the drive-side rotor 20 in the circumferential direction; and L6 is an axial length of a circumferentially contacting part of the Oldham intermediate 63 that is configured to circumferentially contact the drive-side rotor 20.

In the present embodiment, the drive-side rotor 20 includes a ring-shaped projection 211. The ring-shaped projection 211 is shaped in a ring form such that the ring-shaped projection 211 projects from a driven-side rotor 30 side surface of the bottom part of the rotor tubular portion 21 toward the driven-side rotor 30. When the driven-side rotor 30 is tilted relative to the drive-side rotor 20, an end part of the driven-side rotor 30, which is opposite to the bottom part of the driven-side rotor 30, can contact a driven-side rotor 30 side surface of the Oldham intermediate 63 at one axial side of the driven-side rotor 30, and another end part of the driven-side rotor 30, which is located on the bottom part side, can contact the ring-shaped projection 211 at another axial side of the driven-side rotor 30.

Here, the maximum distance L4 is measured in the direction perpendicular to the rotation center axis Cr1 between: the one axially contacting part of the driven-side rotor 30 that is configured to axially contact the Oldham intermediate 63 (serving as the another member) at the one axial side of the driven-side rotor 30; and the another axially contacting part of the driven-side rotor 30 that is configured to axially contact the drive-side rotor 20 (serving as the further another member) at the another axial side of the driven-side rotor 30. This maximum distance L4 corresponds to a distance measured in the direction perpendicular to the rotation center axis Cr1 between: an outer edge end (radially outer end) 301 of the end surface of the driven-side rotor 30, which is opposite to the bottom part of the driven-side rotor 30; and a specific point 302 of the driven-side rotor 30, which is opposed to an outer edge end (radially outer end) 212 of the ring-shaped projection 211 in a plane that includes the rotation center axis Cr1 and the outer edge end 301 (see FIG. 6).

Since the clearances are set between the Oldham coupling 60 and the other members and are also set between the corresponding adjacent members of the Oldham coupling 60, the axes of, for example, the driven-side rotor 30, the planetary rotor 50 and the Oldham intermediate 63 of the Oldham coupling 60 may possibly be tilted relative to the drive-side rotor 20 during the operation of the valve timing adjustment device 10 (see FIG. 5).

As described above, in the present embodiment, there is provided the thrust section 90 that is configured to limit the tilting of the planetary rotor 50 relative to the driven Oldham flanges 61 when the thrust section 90 contacts the planetary rotor 50 in the axial direction of the rotation center axis Cr1. Therefore, even when the planetary rotor 50 is tilted relative to the driven Oldham flanges 61, this tilting of the planetary rotor 50 can be limited.

Furthermore, the valve timing adjustment device 10 is configured to satisfy the relationship of $\theta 2 > \theta 1$. Therefore, even in the tilted state where the planetary rotor 50 is tilted by the maximum tilt amount $\theta 1$ relative to the driven Oldham flanges 61, it is possible to ensure presence of a clearance, which corresponds to $\theta 2 - \theta 1$, in the Oldham coupling 60.

As described above, according to the present embodiment, there is provided the valve timing adjustment device 10 for adjusting the valve timing of the intake valve 4 that is opened and closed by the camshaft 3 with the torque transmitted from the crankshaft 2 of the engine 1. The valve timing adjustment device 10 includes the drive-side rotor 20, the driven-side rotor 30, the internal gear section 40, the planetary rotor 50, the Oldham coupling 60 and the thrust section 90.

The drive-side rotor 20 is configured to be rotated synchronously with the crankshaft 2 about the rotation center axis Cr1 that is coaxial with the camshaft 3. The driven-side rotor 30 is configured to be rotated integrally with the camshaft 3 about the rotation center axis Cr1. The internal gear section 40 is formed at the driven-side rotor 30 (serving as the one of the driven-side rotor 30 and the drive-side rotor 20). The planetary rotor 50 has the planetary gear section 51 which is eccentric to the rotation center axis Cr1 and is meshed with the internal gear section 40. The Oldham coupling 60 includes: the driven Oldham flange 61 that is formed at the drive-side rotor 20 (serving as another one of the driven-side rotor 30 and the drive-side rotor 20); the drive Oldham flange 62 that is formed at the planetary rotor 50; and the Oldham intermediate 63 that is configured to synchronize rotation of the driven Oldham flange 61 and rotation of the drive Oldham flange 62 while permitting eccentricity between the driven Oldham flange 61 and the drive Oldham flange 62.

The thrust section 90 is formed at the rotor plate portion 22 of the drive-side rotor 20 (serving as the portion which is other than the Oldham coupling 60). The thrust section 90 is configured to limit tilting of the planetary rotor 50 relative to the driven Oldham flange 61 when the thrust section 90 contacts the planetary rotor 50 in the axial direction of the rotation center axis Cr1. Therefore, the orientation of the planetary rotor 50 can be stabilized by the thrust section 90 formed at the portion that is other than the Oldham coupling 60.

The valve timing adjustment device is configured to satisfy the relationship of $\theta 2 > \theta 1$ where: $\theta 1$ is the maximum tilt amount of the planetary rotor 50 relative to the driven Oldham flange 61; and $\theta 2$ is the maximum tilt amount of the planetary rotor 50 in the clearance formed at the Oldham coupling 60. Therefore, the tilting of the planetary rotor 50 is not limited by the respective members of the Oldham coupling 60, and even in the tilted state where the planetary rotor 50 is tilted by the maximum tilt amount $\theta 1$ relative to the driven Oldham flange 61, it is possible to ensure presence of the clearance, which corresponds to $\theta 2 - \theta 1$, in the Oldham coupling 60. Thus, the friction of the Oldham coupling 60 can be reduced. As a result, the transmission efficiency of the Oldham coupling 60 can be improved with the simple structure without a need for providing the urging member that urges the planetary rotor 50 in the axial direction.

The thrust section 90 can be easily set at a location that is radially spaced from the rotation center of the planetary rotor 50. Therefore, even in a case of a relatively small load, it is possible to resist the tilting moment. Thus, the orientation of the planetary rotor 50 can be efficiently stabilized without increasing the friction loss.

Furthermore, according to the present embodiment, the valve timing adjustment device 10 is configured to satisfy at least one of the relationship of $\theta 2b > \theta 1$ or the relationship of $\theta 2a > \theta 1$ where: the relative moving direction of the Oldham intermediate 63 relative to the drive Oldham flange 62 is defined as the first direction; the relative moving direction of the Oldham intermediate 63 relative to the driven Oldham flange 61 is defined as the second direction; $\theta 2a$ is the maximum tilt amount of the planetary rotor 50 in the clearance formed at the Oldham coupling 60 and is the rotation angle of the planetary rotor 50 about the first rotation axis Axr1 that is parallel to the first direction; and $\theta 2b$ is the maximum tilt amount of the planetary rotor 50 in the clearance formed at the Oldham coupling 60 and is the rotation angle of the planetary rotor 50 about the second rotation axis Axr2 that is parallel to the second direction (see FIGS. 4 and 6).

Furthermore, according to the present embodiment, the valve timing adjustment device is further configured to satisfy all of the relationships of: $\theta 1 = \arctan(CL5/L3)$; $\theta 2a = \arctan((CL1+CL2)/L1) + \arctan((CL3+CL4)/L2)$; and $\theta 2b = \arctan(CL6/L4) + \min\{\arctan((CL7+CL8)/L6), \arctan((CL1+CL2)/L5)\}$ where: CL1 is the one of the two opposite axial clearances respectively formed between the Oldham intermediate 63 and the drive-side rotor 20 in the axial direction, and CL2 is the another one of the two opposite axial clearances respectively formed between the Oldham intermediate 63 and the drive-side rotor 20 in the axial direction; L1 is the diameter of the axially contacting part of the Oldham intermediate 63 that is configured to axially contact the drive-side rotor 20; CL3 is the one of the two opposite circumferential clearances respectively formed between the planetary rotor 50 and the Oldham intermediate 63 in the circumferential direction, and CL4 is the another one of the two opposite circumferential clearances respectively formed between the planetary rotor 50 and the Oldham intermediate 63 in the circumferential direction; L2 is the axial length of the circumferentially contacting part of the Oldham intermediate 63 that is configured to circumferentially contact the planetary rotor 50; CL5 is the axial clearance between the planetary rotor 50 and the drive-side rotor 20; L3 is the diameter of the axially contacting part of the planetary rotor 50 that is configured to axially contact the drive-side rotor 20; CL6 is the axial clearance between the Oldham intermediate 63 and the driven-side rotor 30; L4 is the maximum distance in the direction perpendicular to the rotation center axis Cr1 between: the outer edge end 301 (serving as the one axially contacting part) of the driven-side rotor 30 that is configured to axially contact the Oldham intermediate 63 (serving as the another member) at the one axial side of the driven-side rotor 30; and the specific point 302 (serving as the another axially contacting part) of the driven-side rotor 30 that is configured to axially contact the drive-side rotor 20 (serving as the further another member) at the another axial side of the driven-side rotor 30; L5 is the circumferential length of the axially contacting part of the Oldham intermediate 63 that is configured to axially contact the drive-side rotor 20; CL7 is the one of the two opposite circumferential clearances respectively formed between the Oldham intermediate 63 and the drive-side rotor 20 in the circumferential direction, and CL8 is the another one of the two opposite circumferential clearances respectively formed between the Oldham intermediate 63 and the drive-side rotor 20 in the circumferential direction; and L6 is the axial length of the circumferentially contacting part of the Oldham intermediate 63 that is configured to circumferentially contact the drive-side rotor 20. Therefore, the respective members of the Oldham coupling 60 can be smoothly moved relative to the driven Oldham flange 61 and the drive Oldham flange 62, and thereby the transmission efficiency of the Oldham coupling 60 can be further improved.

Second Embodiment

FIGS. 8 to 12 show a valve timing adjustment device of a second embodiment. The second embodiment differs from the first embodiment with respect to the structure of the eccentric shaft 70 and the position of the planetary rotor 50.

In the present embodiment, the outer peripheral wall of the end part of the eccentric shaft 70, which is opposite to the camshaft 3, is eccentric to the rotation center axis Cr1. Specifically, the outer peripheral wall of the end part of the eccentric shaft 70, which is opposite to the camshaft 3, is formed to extend along a cylindrical surface that is centered on the eccentric center axis Ce1 while the eccentric center axis Ce1 is spaced from the rotation center axis Cr1 in the eccentric direction and is parallel to the rotation center axis Cr1. An outer peripheral wall of the camshaft 3 side end part of the eccentric shaft 70 is formed to extend along a cylindrical surface that is centered on the rotation center axis Cr1 (see FIGS. 9 and 11).

The bearing 11 is installed between the outer peripheral wall of the end part of the eccentric shaft 70, which is opposite to the camshaft 3, and the inner peripheral wall of the planetary rotor 50. The bearing 12 is installed between the outer peripheral wall of the camshaft 3 side end part of the eccentric shaft 70 and the inner peripheral wall of the camshaft 3 side end part of the driven-side rotor 30.

The internal gear section 40 is formed at the inner peripheral wall of the driven-side rotor 30 such that the internal gear section 40 is meshed with the planetary gear section 51. The meshing part 41 is formed between the internal gear section 40 and the planetary gear section 51.

The urging members 13 are installed to the outer peripheral wall of the end part of the eccentric shaft 70, which is opposite to the camshaft 3, such that the urging members 13 are placed at the eccentric side of the outer peripheral wall of the end part of the eccentric shaft 70. The urging members 13 urge the planetary rotor 50 through the bearing 11 toward the radially outer side of the planetary rotor 50, i.e., in the eccentric direction of the planetary rotor 50. The urging members 13 urge the planetary gear section 51 against the internal gear section 40 in the eccentric direction of the planetary rotor 50.

Figure 9:
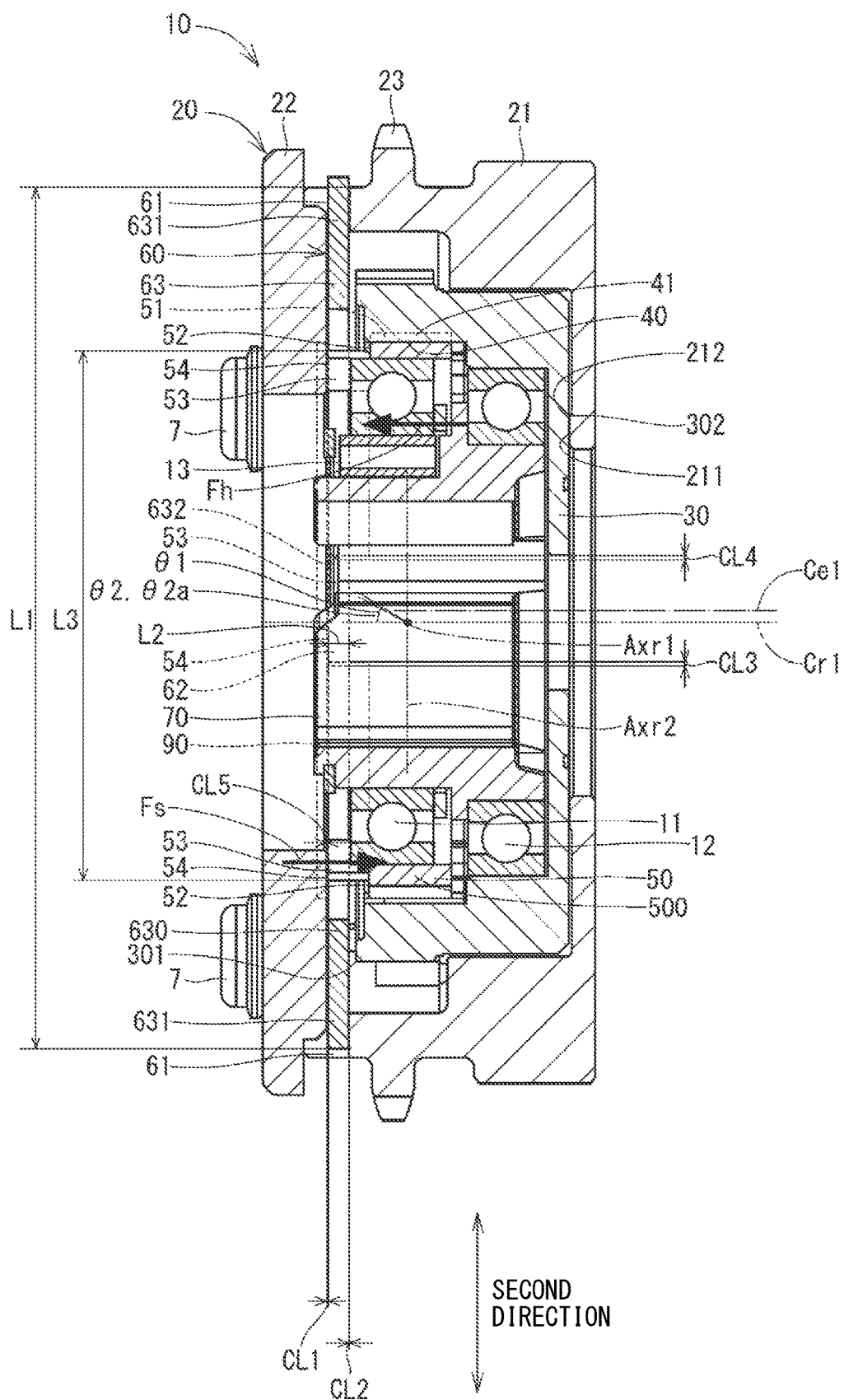
FIG. 9 is a cross-sectional view taken along line IX-IX in FIG. 8.
Figure 10:
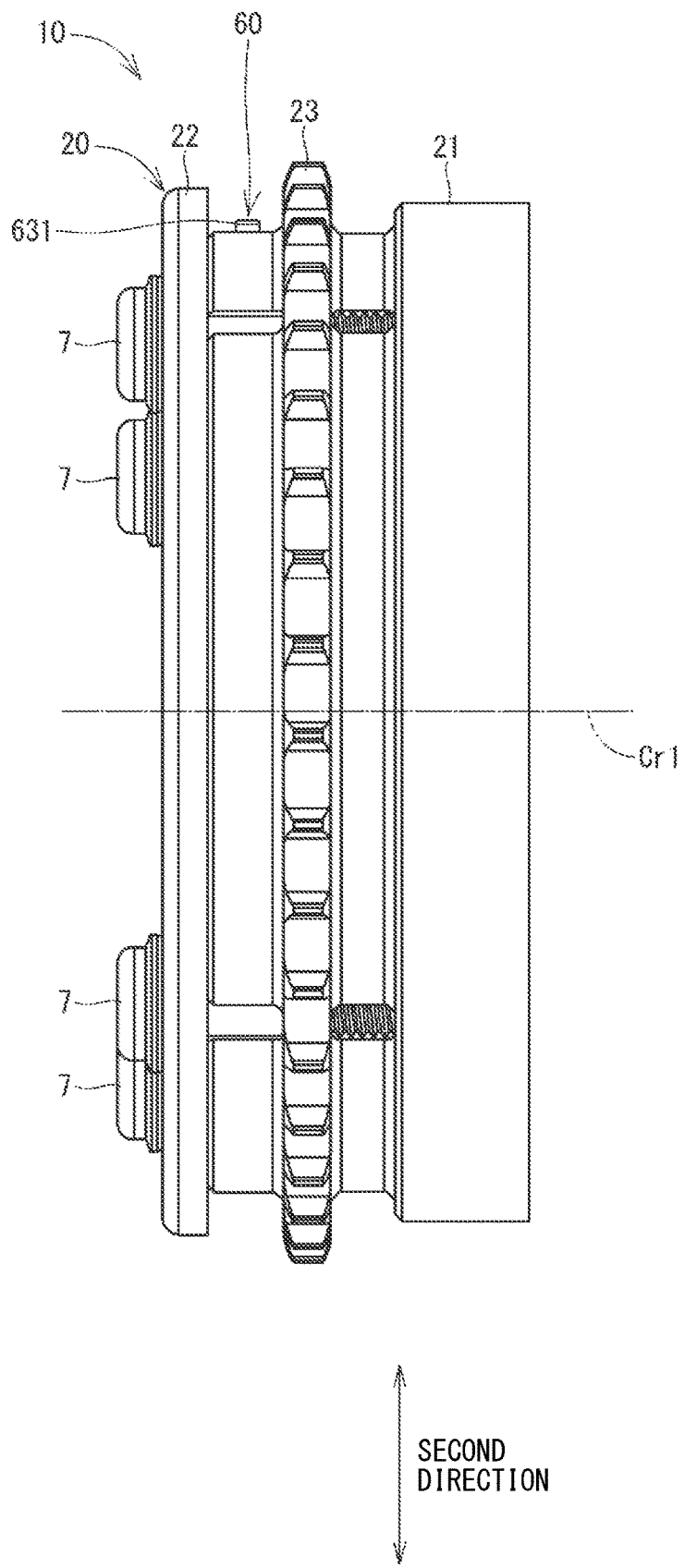
FIG. 10 is a view seen in a direction of an arrow X in FIG. 8.
Figure 11:
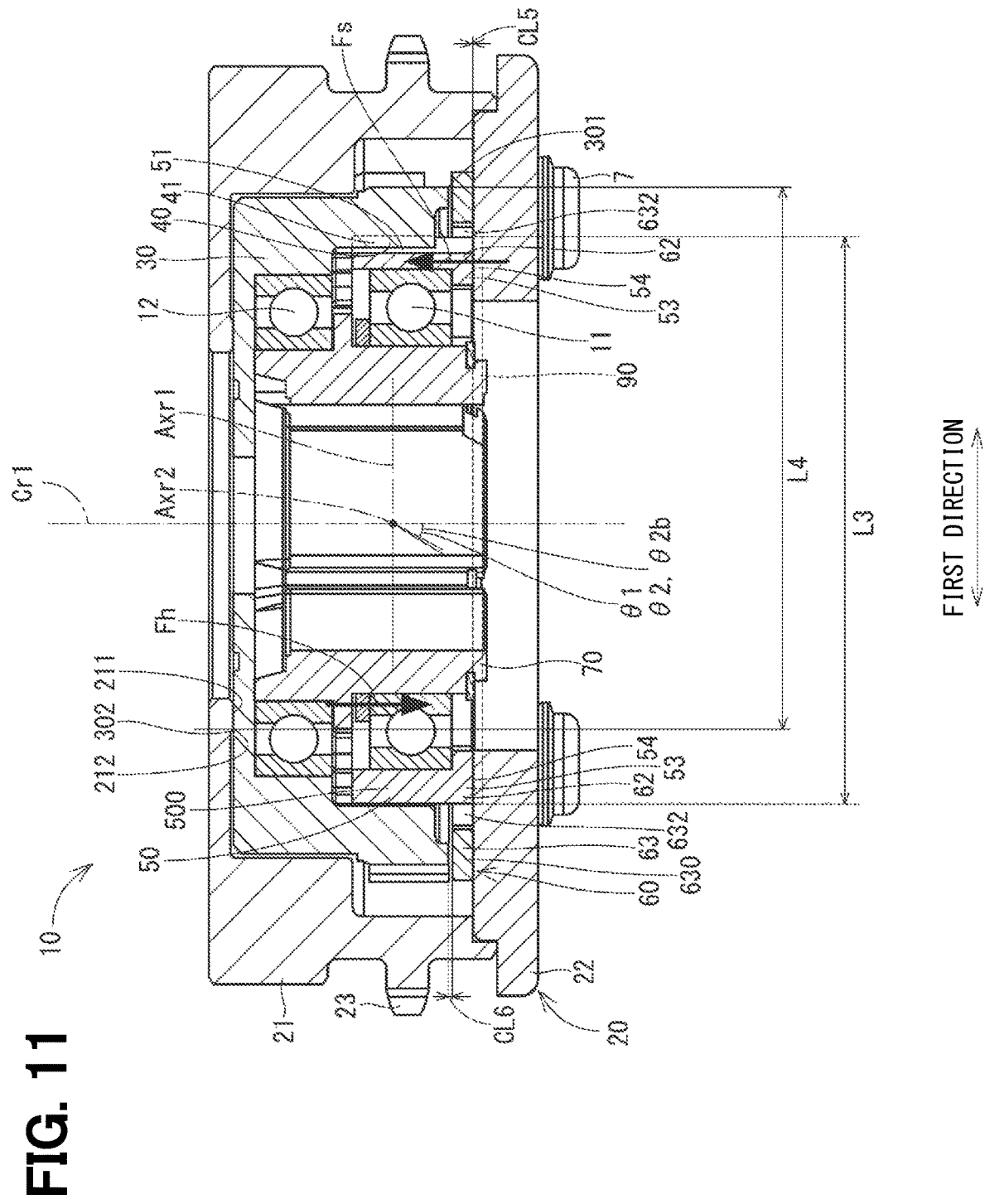
FIG. 11 is a cross-sectional view taken along line XI-XI in FIG. 8.

In the present embodiment, the thrust section 90 is formed at the rotor plate portion 22 of the drive-side rotor 20 (serving as a portion which is other than the Oldham coupling 60) at a location where the thrust section 90 is opposed to the planetary rotor 50 (see FIGS. 9 and 11). The thrust section 90 is configured to contact the surface of the planetary rotor 50, i.e., the end surface 54 of one or more of the projections 53 located on the side opposite to the camshaft 3 in the axial direction of the rotation center axis Cr1. The thrust section 90 is configured to limit the tilting of the planetary rotor 50 relative to the driven Oldham flanges 61 when the thrust section 90 contacts the planetary rotor 50 in the axial direction of the rotation center axis Cr1.

In the present embodiment, like in the first embodiment, the valve timing adjustment device 10 is configured to satisfy the relationship of $\theta 2 > \theta 1$ where: $\theta 1$ is the maximum tilt amount of the planetary rotor 50 relative to the driven Oldham flanges 61; and $\theta 2$ is the maximum tilt amount of the planetary rotor 50 in the clearance formed at the Oldham coupling 60.

Furthermore, in the present embodiment, like in the first embodiment, the valve timing adjustment device 10 is configured to satisfy at least one of the relationship of $\theta 2b > \theta 1$ or the relationship of $\theta 2a > \theta 1$ where: the relative moving direction of the Oldham intermediate 63 relative to the drive Oldham flanges 62 is defined as the first direction; the relative moving direction of the Oldham intermediate 63 relative to the driven Oldham flanges 61 is defined as the second direction; $\theta 2a$ is the maximum tilt amount of the planetary rotor 50 in the clearance formed at the Oldham coupling 60 and is the rotation angle of the planetary rotor 50 about the first rotation axis Axr1 that is parallel to the first direction; and $\theta 2b$ is the maximum tilt amount of the planetary rotor 50 in the clearance formed at the Oldham coupling 60 and is the rotation angle of the planetary rotor 50 about the second rotation axis Axr2 that is parallel to the second direction (see FIGS. 9 and 11).

With reference to FIG. 9, in the present embodiment, like in the first embodiment, the valve timing adjustment device 10 is configured to satisfy the relationship of $\theta 1 = \arctan(CL5/L3)$ and the relationship of $\theta 2a = \arctan((CL1+CL2)/L1) + \arctan((CL3+CL4)/L2)$ where: CL1 is the one of the two opposite axial clearances respectively formed between the Oldham intermediate 63 and the drive-side rotor 20 in the axial direction, and CL2 is the another one of the two opposite axial clearances respectively formed between the Oldham intermediate 63 and the drive-side rotor 20 in the axial direction; L1 is the diameter of the axially contacting part of the Oldham intermediate 63 that is configured to axially contact the drive-side rotor 20; CL3 is the one of the two opposite circumferential clearances respectively formed between the planetary rotor 50 and the Oldham intermediate 63 in the circumferential direction, and CL4 is the another one of the two opposite circumferential clearances respectively formed between the planetary rotor 50 and the Oldham intermediate 63 in the circumferential direction; L2 is the axial length of the circumferentially contacting part of the Oldham intermediate 63 that is configured to circumferentially contact the planetary rotor 50; CL5 is the axial clearance between the planetary rotor 50 and the drive-side rotor 20; and L3 is the diameter of the axially contacting part of the planetary rotor 50 that is configured to axially contact the drive-side rotor 20.

Figure 12:
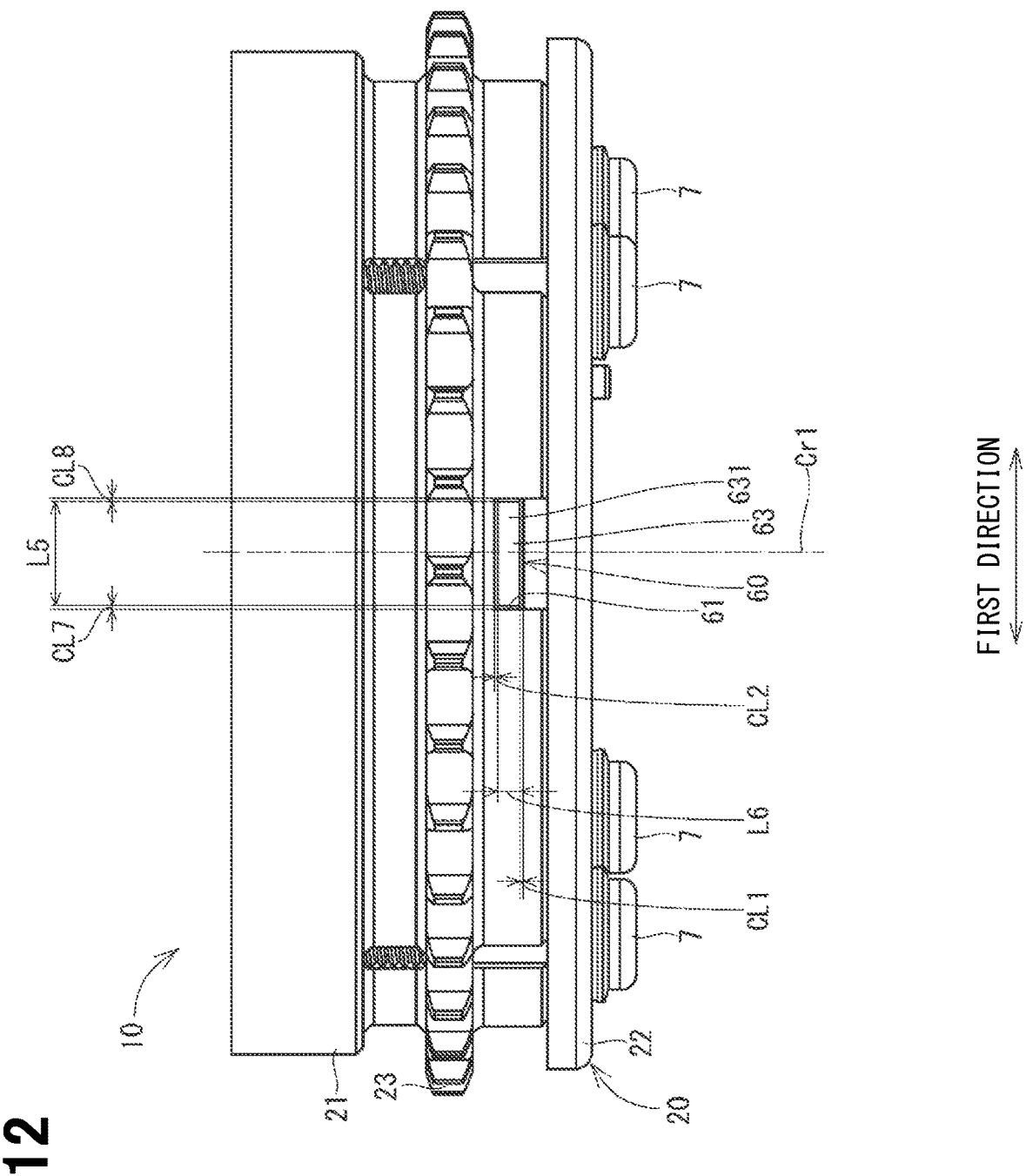
FIG. 12 is a view seen in a direction of an arrow XII in FIG. 8.

Furthermore, with reference to FIGS. 11 and 12, in the present embodiment, like in the first embodiment, the valve timing adjustment device 10 is configured to satisfy the relationship of $\theta 2b = \arctan(CL6/L4) + \min\{\arctan((CL7+CL8)/L6), \arctan((CL1+CL2)/L5)\}$ where: CL6 is the axial clearance between the Oldham intermediate 63 and the driven-side rotor 30; L4 is the maximum distance in the direction perpendicular to the rotation center axis Cr1 between: the one axially contacting part of the driven-side rotor 30 that is configured to axially contact the another member at the one axial side of the driven-side rotor 30; and the another axially contacting part of the driven-side rotor 30 that is configured to axially contact the further another member at the another axial side of the driven-side rotor 30; L5 is the circumferential length of the axially contacting part of the Oldham intermediate 63 that is configured to axially contact the drive-side rotor 20; CL7 is the one of the two opposite circumferential clearances respectively formed between the Oldham intermediate 63 and the drive-side rotor 20 in the circumferential direction, and CL8 is the another one of the two opposite circumferential clearances respectively formed between the Oldham intermediate 63 and the drive-side rotor 20 in the circumferential direction; and L6 is the axial length of the circumferentially contacting part of the Oldham intermediate 63 that is configured to circumferentially contact the drive-side rotor 20.

In the present embodiment, like in the first embodiment, the drive-side rotor 20 includes the ring-shaped projection 211. The ring-shaped projection 211 is shaped in the ring form such that the ring-shaped projection 211 projects from the driven-side rotor 30 side surface of the bottom part of the rotor tubular portion 21 toward the driven-side rotor 30. When the driven-side rotor 30 is tilted relative to the drive-side rotor 20, the end part of the driven-side rotor 30, which is opposite to the bottom part of the driven-side rotor 30, can contact the driven-side rotor 30 side surface of the Oldham intermediate 63 at the one axial side of the driven-side rotor 30, and the another end part of the driven-side rotor 30, which is located on the bottom part side, can contact the ring-shaped projection 211 at the another axial side of the driven-side rotor 30.

Here, the maximum distance L4 is measured in the direction perpendicular to the rotation center axis Cr1 between: the one axially contacting part of the driven-side rotor 30 that is configured to axially contact the Oldham intermediate 63 (serving as the another member) at the one axial side of the driven-side rotor 30; and the another axially contacting part of the driven-side rotor 30 that is configured to axially contact the drive-side rotor 20 (serving as the further another member) at the another axial side of the driven-side rotor 30. This maximum distance L4 corresponds to the distance measured in the direction perpendicular to the rotation center axis Cr1 between: the outer edge end 301 of the end surface of the driven-side rotor 30, which is opposite to the bottom part of the driven-side rotor 30; and the specific point 302 of the driven-side rotor 30, which is opposed to the outer edge end 212 of the ring-shaped projection 211 in the plane that includes the rotation center axis Cr1 and the outer edge end 301 (see FIG. 11).

As shown in FIGS. 9 and 11, a reaction force (serving as a tilting force) Fh of a thrust force Fs, which is applied from the thrust section 90 to the planetary rotor 50, is supported by the bearing 11, so that the friction between the thrust section 90 and the planetary rotor 50 can be reduced.

As described above, in the present embodiment, like in the first embodiment, the valve timing adjustment device 10 is configured to satisfy the relationship of $\theta 2 > \theta 1$. As a result, the transmission efficiency at the Oldham coupling 60 can be improved with the simple structure without a need for providing the urging member that urges the planetary rotor 50 in the axial direction.

Furthermore, in the present embodiment, like in the first embodiment, the valve timing adjustment device 10 is configured to satisfy at least one of the relationship of $\theta 2b > \theta 1$ or the relationship of $\theta 2a > \theta 1$. Also, the valve timing adjustment device 10 is further configured to satisfy all of the relationships of: $\theta 1$=arctan (CL5/L3); $\theta 2a$=arctan ((CL1+CL2)/L1)+arctan ((CL3+CL4)/L2); and $\theta 2b$=arctan (CL6/L4)+min {arctan ((CL7+CL8)/L6), arctan ((CD+CL2)/L5)}. Therefore, the respective members of the Oldham coupling 60 can be smoothly moved relative to the driven Oldham flanges 61 and the drive Oldham flanges 62, and thereby the transmission efficiency of the Oldham coupling 60 can be further improved.

Third Embodiment

Figure 13:
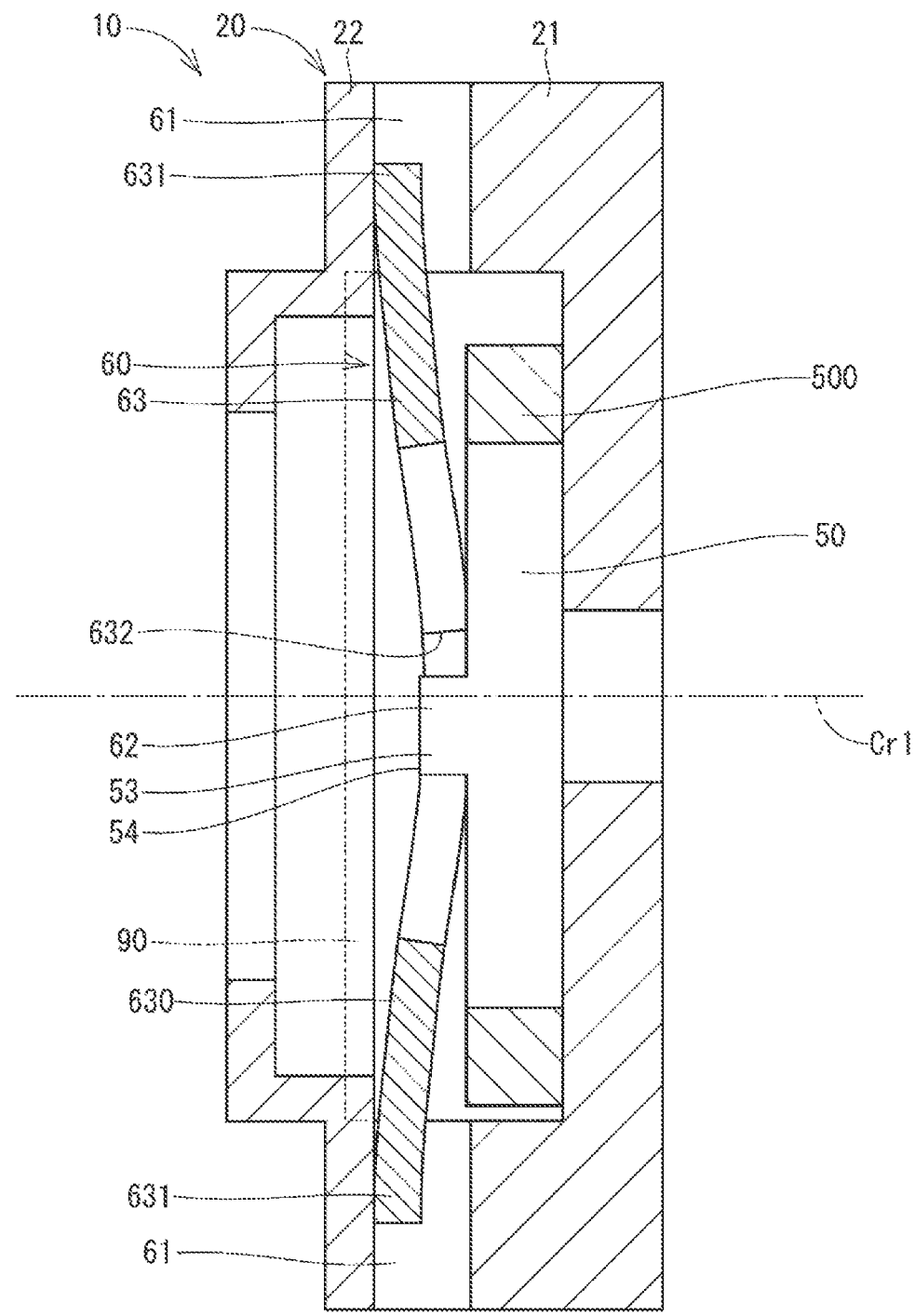
FIG. 13 is a schematic cross-sectional view showing a portion of a valve timing adjustment device of a third embodiment.

FIG. 13 shows a valve timing adjustment device of a third embodiment. The third embodiment differs from the first embodiment with respect to the structure of the Oldham intermediate 63.

Figure 14:
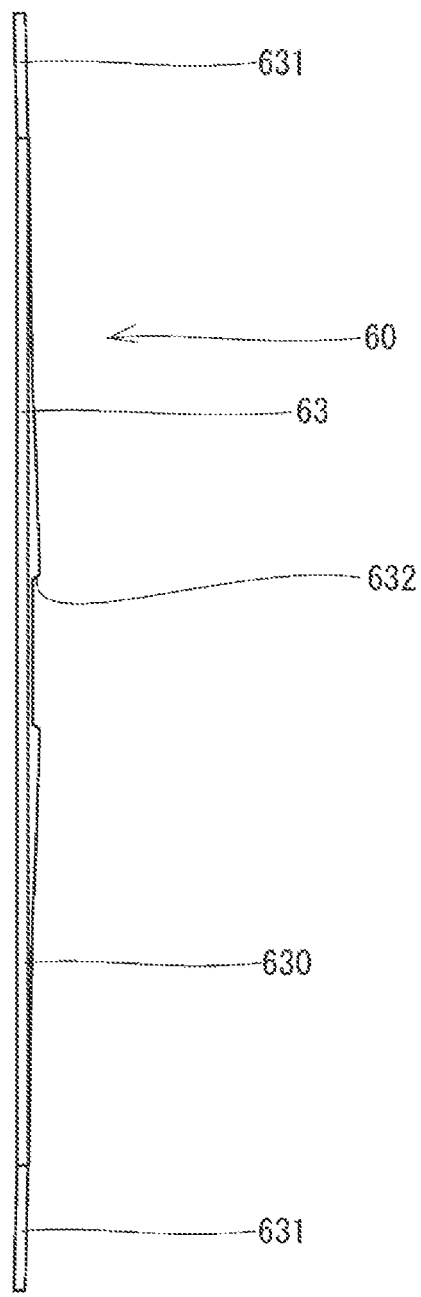
FIG. 14 is a diagram showing an Oldham intermediate of the valve timing adjustment device of a third embodiment.
Figure 15:
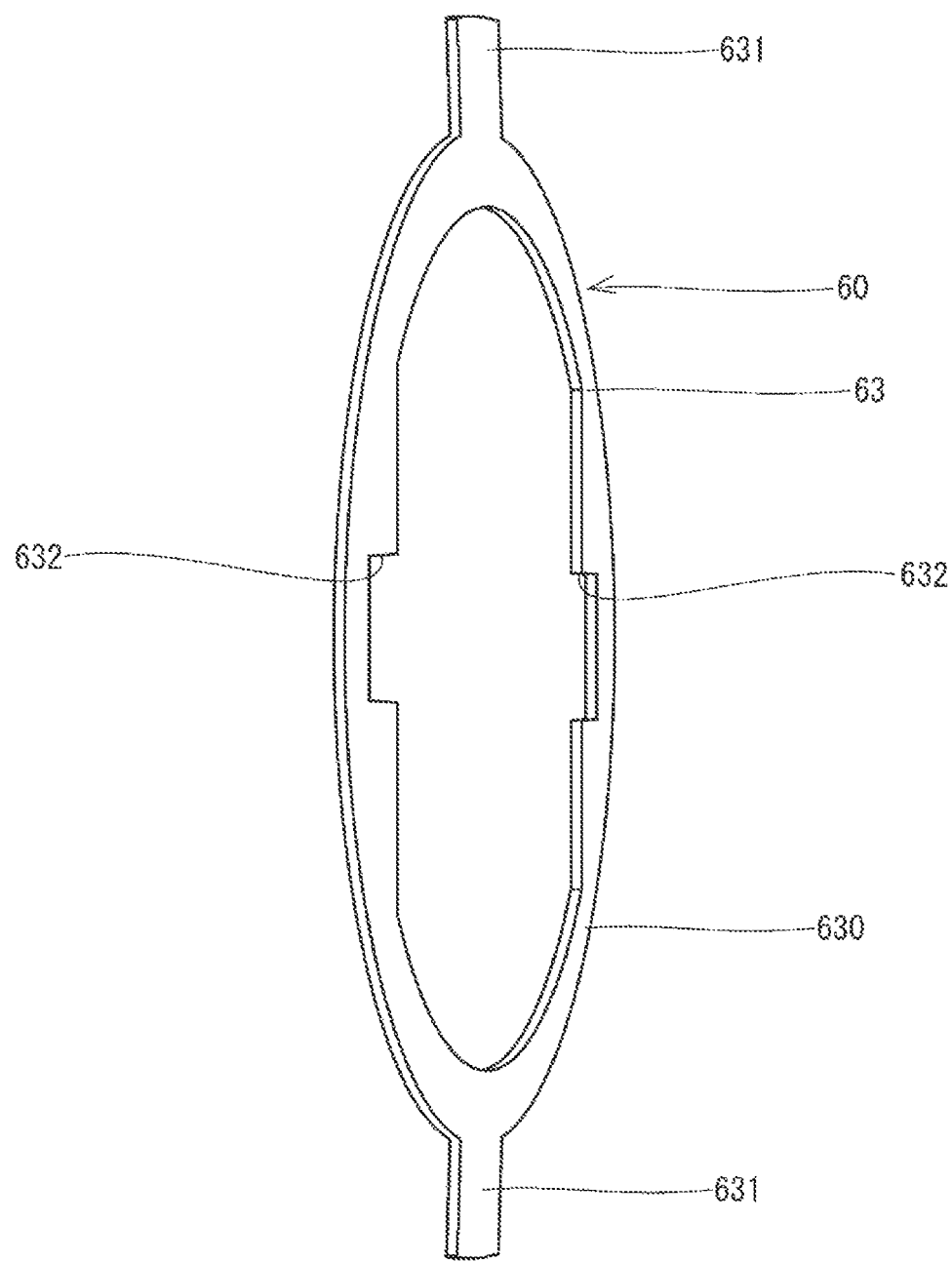
FIG. 15 is a perspective view showing the Oldham intermediate of the valve timing adjustment device of the third embodiment.

In the present embodiment, the Oldham intermediate 63 is made of, for example, a resilient material, such as metal. The Oldham intermediate 63 is formed such that the center of the Oldham intermediate 63 projects toward the planetary rotor 50 (see FIGS. 13 to 15).

The Oldham intermediate 63 is installed between the planetary rotor 50 and the rotor plate portion 22. Therefore, the Oldham intermediate 63 urges the planetary rotor 50 toward the bottom part of the rotor tubular portion 21. Thus, the drive Oldham flanges 62 are spaced away from the driven Oldham flanges 61 in the axial direction of the rotation center axis Cr1. The depiction of the driven-side rotor 30 and the like is omitted in FIG. 13 for the sake of simplicity.

The thrust section 90 is configured to contact the surface of the planetary rotor 50, i.e., the end surface 54 of one or more of the projections 53 located on the side opposite to the camshaft 3 in the axial direction of the rotation center axis Cr1. The thrust section 90 is configured to limit the tilting of the planetary rotor 50 relative to the driven Oldham flanges 61 when the thrust section 90 contacts the planetary rotor 50 in the axial direction of the rotation center axis Cr1.

As described above, according to the present embodiment, the Oldham intermediate 63 is configured to generate an urging force for urging the driven Oldham flange 61 and the drive Oldham flange 62 away from each other. Thus, it is possible to reduce the clearance between the Oldham coupling 60 and the other member and the clearance in the Oldham coupling 60. Therefore, it is possible to limit the generation of the noise from the Oldham coupling 60 at the time of operating the valve timing adjustment device 10. Furthermore, the planetary rotor 50, which has the drive Oldham flanges 62, is urged by the Oldham intermediate 63 toward the bottom part of the rotor tubular portion 21 so that the orientation of the planetary rotor 50 can be stabilized. As a result, the transmission efficiency at the Oldham coupling 60 can be improved with the simple structure without a need for providing the urging member that urges the planetary rotor 50 in the axial direction.

Other Embodiments

In another embodiment, as long as at least one of the relationship of $\theta 2b > \theta 1$ or the relationship of $\theta 2a > \theta 1$ is satisfied, the valve timing adjustment device 10 may not satisfy the relationships of: $\theta 1$=arctan (CL5/L3); $\theta 2a$=arctan ((CL1+CL2)/L1)+arctan ((CL3+CL4)/L2); and $\theta 2b$=arctan (CL6/L4)+min {arctan ((CL7+CL8)/L6), arctan ((CL1+CL2)/L5)}.

In the above embodiments, there is discussed the example where the internal gear section 40 is formed at the driven-side rotor 30 (serving as the one of the driven-side rotor 30 and the drive-side rotor 20), and the driven Oldham flanges 61 is formed at the drive-side rotor 20 (serving as the another one of the driven-side rotor 30 and the drive-side rotor 20). In contrast, in another embodiment, the internal gear section 40 may be formed at the drive-side rotor 20 (serving as the one of the driven-side rotor 30 and the drive-side rotor 20), and the driven Oldham flanges 61 may be formed at the driven-side rotor 30 (serving as the another one of the driven-side rotor 30 and the drive-side rotor 20).

Furthermore, in another embodiment, for example, a belt may be used as the looped transmission member 6 in place of the chain.

In another embodiment, the valve timing adjustment device 10 may adjust a valve timing of the exhaust valves 5 of the engine 1.

As described above, the present disclosure should not be limited to the above embodiments and may be implemented in various forms without departing from the scope of the present disclosure.

The present disclosure has been described with reference to the embodiments. However, the present disclosure should not be limited to the embodiments and the structures described therein. The present disclosure also includes various variations and variations within an equivalent range. Furthermore, other combinations and other forms including various combinations and various forms of only one element, or more, or less, are also within the scope and spirit of the present disclosure.

What is claimed is:

1. A valve timing adjustment device for adjusting a valve timing of a valve that is opened and closed by a camshaft with a torque transmitted from a crankshaft at an internal combustion engine, the valve timing adjustment device comprising:
   a drive-side rotor that is configured to be rotated synchronously with the crankshaft about a rotation center axis that is coaxial with the camshaft;
   a driven-side rotor that is configured to be rotated integrally with the camshaft about the rotation center axis;
   an internal gear section that is formed at one of the driven-side rotor and the drive-side rotor;
   a planetary rotor that has a planetary gear section which is eccentric to the rotation center axis and is meshed with the internal gear section;
   an Oldham coupling that includes:
      a driven Oldham flange that is formed at another one of the driven-side rotor and the drive-side rotor;
      a drive Oldham flange that is formed at the planetary rotor; and
      an Oldham intermediate that is configured to synchronize rotation of the driven Oldham flange and rotation of the drive Oldham flange while permitting eccentricity between the driven Oldham flange and the drive Oldham flange; and
   a thrust section that is formed at a portion which is other than the Oldham coupling, wherein the thrust section is configured to limit tilting of the planetary rotor relative to the driven Oldham flange when the thrust section contacts the planetary rotor in an axial direction of the rotation center axis, wherein:
   the valve timing adjustment device is configured to satisfy a relationship of $\theta 2 > \theta 1$ where: $\theta 1$ is a maximum tilt amount of the planetary rotor relative to a surface of the driven Oldham flange which is opposed to the Oldham intermediate in the axial direction; and $\theta 2$ is a maximum tilt amount of the planetary rotor in a clearance formed at the Oldham coupling;
   the valve timing adjustment device is configured to satisfy at least one of a relationship of $\theta 2b > \theta 1$ or a relationship of $\theta 2a > \theta 1$ where:
   a relative moving direction of the Oldham intermediate relative to the drive Oldham flange is defined as a first direction;
   a relative moving direction of the Oldham intermediate relative to the driven Oldham flange is defined as a second direction;
   $\theta 2a$ is a maximum tilt amount of the planetary rotor in the clearance formed at the Oldham coupling and is a rotation angle of the planetary rotor about a first rotation axis that is parallel to the first direction; and
   $\theta 2b$ is a maximum tilt amount of the planetary rotor in the clearance formed at the Oldham coupling and is a rotation angle of the planetary rotor about a second rotation axis that is parallel to the second direction; and
   the valve timing adjustment device is further configured to satisfy all of the relationships of $\theta 1 = \arctan(CL5/L3);$ $\theta 2a = \arctan((CL1+CL2)/L1) + \arctan((CL3+CL4)/L2);$ and $\theta 2b = \arctan(CL6/L4) + \min\{\arctan((CL7+CL8)/L6), \arctan((CL1+CL2)/L5)\}$ where:
CL1 is one of two opposite axial clearances respectively formed between the Oldham intermediate and the drive-side rotor in the axial direction, and CL2 is another one of the two opposite axial clearances respectively formed between the Oldham intermediate and the drive-side rotor in the axial direction;
L1 is a diameter of an axially contacting part of the Oldham intermediate that is configured to axially contact the drive-side rotor;
CL3 is one of two opposite circumferential clearances respectively formed between the planetary rotor and the Oldham intermediate in a circumferential direction, and CL4 is another one of the two opposite circumferential clearances respectively formed between the planetary rotor and the Oldham intermediate in the circumferential direction;
L2 is an axial length of a circumferentially contacting part of the Oldham intermediate that is configured to circumferentially contact the planetary rotor;
CL5 is an axial clearance between the planetary rotor and the drive-side rotor;
L3 is a diameter of an axially contacting part of the planetary rotor that is configured to axially contact the drive-side rotor;
CL6 is an axial clearance between the Oldham intermediate and the driven-side rotor;
L4 is a maximum distance in a direction perpendicular to the rotation center axis between: one axially contacting part of the driven-side rotor that is configured to axially contact another member at one axial side of the driven-side rotor; and another axially contacting part of the driven-side rotor that is configured to axially contact further another member at another axial side of the driven-side rotor;
L5 is a circumferential length of the axially contacting part of the Oldham intermediate that is configured to axially contact the drive-side rotor;
CL7 is one of two opposite circumferential clearances respectively formed between the Oldham intermediate and the drive-side rotor in the circumferential direction, and CL8 is another one of the two opposite circumferential clearances respectively formed between the Oldham intermediate and the drive-side rotor in the circumferential direction;

L6 is an axial length of a circumferentially contacting part of the Oldham intermediate that is configured to circumferentially contact the drive-side rotor; and min denotes a minimum function.

2. The valve timing adjustment device according to claim 1, wherein the Oldham intermediate is configured to generate an urging force for urging the driven Oldham flange and the drive Oldham flange away from each other.

* * * * *